United States Patent
Tsai et al.

(10) Patent No.: US 10,659,779 B2
(45) Date of Patent: May 19, 2020

(54) LAYERED DEBLOCKING FILTERING IN VIDEO PROCESSING SYSTEMS AND METHODS

(71) Applicants: REALNETWORKS, INC., Seattle, WA (US); Chia-Yang Tsai, Seattle, WA (US)

(72) Inventors: Chia-Yang Tsai, Seattle, WA (US); Kai Wang, Seattle, WA (US); Chao Kuang, Seattle, WA (US)

(73) Assignee: REALNETWORKS, INC., Seattle, WA (US)

( * ) Notice: Subject to any disclaimer, the term of this patent is extended or adjusted under 35 U.S.C. 154(b) by 5 days.

(21) Appl. No.: 15/765,151

(22) PCT Filed: Sep. 30, 2015

(86) PCT No.: PCT/CN2015/091307
§ 371 (c)(1),
(2) Date: Mar. 30, 2018

(87) PCT Pub. No.: WO2017/054194
PCT Pub. Date: Apr. 6, 2017

(65) Prior Publication Data
US 2018/0295362 A1    Oct. 11, 2018

(51) Int. Cl.
*H04N 19/117*   (2014.01)
*H04N 19/176*   (2014.01)
(Continued)

(52) U.S. Cl.
CPC ......... *H04N 19/117* (2014.11); *H04N 19/157* (2014.11); *H04N 19/176* (2014.11);
(Continued)

(58) Field of Classification Search
CPC .. H04N 19/117; H04N 19/619; H04N 19/157; H04N 19/176; H04N 19/86; H04N 19/60
See application file for complete search history.

(56) References Cited

U.S. PATENT DOCUMENTS

| 2006/0115168 A1 | 6/2006 | Kobayashi |
| 2012/0237132 A1 | 9/2012 | Kihara et al. |

(Continued)

FOREIGN PATENT DOCUMENTS

| CN | 102823246 A | 12/2012 |
| CN | 102934429 A | 2/2013 |

(Continued)

OTHER PUBLICATIONS

Extended European Search Report, dated Mar. 15, 2019, for European Application No. 15905106.9-1208, 12 pages.
(Continued)

*Primary Examiner* — James M Pontius
(74) *Attorney, Agent, or Firm* — Seed IP Law Group LLP

(57) ABSTRACT

A protocol is provided by which a current block and a neighboring block are identified and the current block is processed. In some variants a deblocking filter is applied with a filtering block size set either to the standard blocksize or to the shared blocksize, depending on whether the shared size of the current and neighboring blocks is smaller than a standard blocksize.

17 Claims, 17 Drawing Sheets

(51) Int. Cl.
*H04N 19/86* (2014.01)
*H04N 19/60* (2014.01)
*H04N 19/157* (2014.01)
*H04N 19/61* (2014.01)

(52) U.S. Cl.
CPC .......... *H04N 19/60* (2014.11); *H04N 19/619* (2014.11); *H04N 19/86* (2014.11)

(56) References Cited

U.S. PATENT DOCUMENTS

| | | | |
|---|---|---|---|
| 2012/0321206 A1* | 12/2012 | Sato | H04N 19/80 382/233 |
| 2013/0028531 A1 | 1/2013 | Sato | |
| 2013/0294525 A1 | 11/2013 | Norkin et al. | |
| 2015/0172677 A1 | 6/2015 | Norkin | |

FOREIGN PATENT DOCUMENTS

| | | | |
|---|---|---|---|
| CN | 103999469 A | | 8/2014 |
| CN | 104662902 A | | 5/2015 |
| CN | 1784011 A | | 6/2016 |
| EP | 2 574 055 A1 | | 3/2013 |
| JP | 2008193548 A | | 8/2008 |
| JP | 2011-223302 A | | 11/2011 |
| JP | 2016-502332 A | | 1/2016 |
| KR | 10-2013-0070597 A | | 6/2013 |
| WO | 2011/145601 A1 | | 11/2011 |
| WO | 2014/007718 A1 | | 1/2014 |
| WO | 2014-087068 A1 | | 5/2014 |
| WO | 2016/154928 A1 | | 10/2016 |

OTHER PUBLICATIONS

List et al., "Adaptive Deblocking Filter," *IEEE Transactions on Circuits and Systems for Video Technology* 13(7), 614-619, 2003.

Norkin et al., "Development of HEVC deblocking filter," Joint Collaborative Team on Video Coding (JCT-VC) of ITU-T SG16 WP3 and ISO/IEC JTC1/SC29/WG11, 4th meeting, Daegu, Korea, Jan. 20-28, 2011. (4 pages).

Shin et al., "Variable block-based deblocking filter for H.264/AVC on low-end and low-bit rates terminals," Signal Processing: *Image Communication* 25(2010), 255-267, 2010.

International Search Report and Written Opinion, dated Jul. 6, 2016, for International Application No. PCT/CN2015/091307, 7 pages.

Notice of Reasons for Rejection for Japanese Application No. 2018-517202, dated Jun. 13, 2019, 14 pages. (with English Translation).

"Research on In-loop Deblocking Filter for High Efficiency Video Coding," with English abstract.

* cited by examiner

LAYERED DEBLOCKING FILTERING IN VIDEO PROCESSING SYSTEMS AND METHODS

FIELD

This disclosure relates to encoding and decoding of video signals, and more particularly, to the efficient mitigation of blocky artifacts.

BACKGROUND

The advent of digital multimedia such as digital images, speech/audio, graphics, and video have significantly improved various applications as well as opened up brand new applications due to relative ease by which it has enabled reliable storage, communication, transmission, and, search and access of content. Overall, the applications of digital multimedia have been many, encompassing a wide spectrum including entertainment, information, medicine, and security, and have benefited the society in numerous ways. Multimedia as captured by sensors such as cameras and microphones is often analog, and the process of digitization in the form of Pulse Coded Modulation (PCM) renders it digital. However, just after digitization, the amount of resulting data can be quite significant as is necessary to re-create the analog representation needed by speakers and/or TV display. Thus, efficient communication, storage or transmission of the large volume of digital multimedia content requires its compression from raw PCM form to a compressed representation. Thus, many techniques for compression of multimedia have been invented. Over the years, video compression techniques have grown very sophisticated to the point that they can often achieve high compression factors between 10 and 100 while retaining high psycho-visual quality, often similar to uncompressed digital video.

While tremendous progress has been made to date in the art and science of video compression (as exhibited by the plethora of standards bodies driven video coding standards such as MPEG-1, MPEG-2, H.263, MPEG-4 part2, MPEG-4 AVC/H.264, MPEG-4 SVC and MVC, as well as industry driven proprietary standards such as Windows Media Video, RealVideo, On2 VP, and the like), the ever increasing appetite of consumers for even higher quality, higher definition, and now 3D (stereo) video, available for access whenever, wherever, has necessitated delivery via various means such as DVD/BD, over the air broadcast, cable/satellite, wired and mobile networks, to a range of client devices such as PCs/laptops, TVs, set top boxes, gaming consoles, portable media players/devices, smartphones, and wearable computing devices, fueling the desire for even higher levels of video compression. In the standards-body-driven standards, this is evidenced by the recently started effort by ISO MPEG in High Efficiency Video Coding (HEVC) which is expected to combine new technology contributions and technology from a number of years of exploratory work on H.265 video compression by ITU-T standards committee.

All aforementioned standards employ a general inter-frame predictive coding framework that involves reducing temporal redundancy by compensating for motion between frames of video. The basic concept is to remove the temporal dependencies between neighboring pictures by using block matching method. At the outset of an encoding process, each frame of the unencoded video sequence is grouped into one of three categories: I-type frames, P-type frames, and B-type frames. I-type frames are intra-coded. That is, only information from the frame itself is used to encode the picture and no inter-frame motion compensation techniques are used (although intra-frame motion compensation techniques may be applied).

The other two types of frames, P-type and B-type, are encoded using inter-frame motion compensation techniques. The difference between P-picture and B-picture is the temporal direction of the reference pictures used for motion compensation. P-type pictures utilize information from previous pictures (in display order), whereas B-type pictures may utilize information from both previous and future pictures (in display order).

For P-type and B-type frames, each frame is then divided into blocks of pixels, represented by coefficients of each pixel's luma and chrominance components, and one or more motion vectors are obtained for each block (because B-type pictures may utilize information from both a future and a past coded frame, two motion vectors may be encoded for each block). A motion vector (MV) represents the spatial displacement from the position of the current block to the position of a similar block in another, previously encoded frame (which may be a past or future frame in display order), respectively referred to as a reference block and a reference frame. The difference, if any, between the reference block and the current block is determined and a residual (also referred to as a "residual signal") is obtained. Therefore, for each block of an inter-coded frame, only the residuals and motion vectors need to be encoded rather than the entire contents of the block. By removing this kind of temporal redundancy between frames of a video sequence, the video sequence can be compressed.

To further compress the video data, after inter or intra frame prediction techniques have been applied, the coefficients of the residual signal are often transformed from the spatial domain to the frequency domain (e.g. using a discrete cosine transform ("DCT") or a discrete sine transform ("DST")). For naturally occurring images, such as the type of images that typically make up human perceptible video sequences, low-frequency energy is always stronger than high-frequency energy. Residual signals in the frequency domain therefore get better energy compaction than they would in spatial domain. After forward transform, the coefficients and may be quantized and entropy encoded before being packetized or otherwise processed, e.g. for transmission over a network such as the Internet.

On the decoder side, inversed quantization and inversed transforms are applied to recover the spatial residual signal. These are typical transform/quantization processes in many video compression standards. A reverse prediction process may then be performed in order to generate a recreated version of the original unencoded video sequence.

In state-of-the art video compression, a deblocking filter (DBF) is a crucial aspect of codec design. The purpose of such filters is to mitigate the so-called "blocky artifacts," discontinuities observable at the boundary between two image blocks, resulting primarily from quantization. There is a great and ongoing need to mitigate such noticeable video image flaws without unduly taxing system resources, a complex challenge.

DETAILED DESCRIPTION

Figure 1:
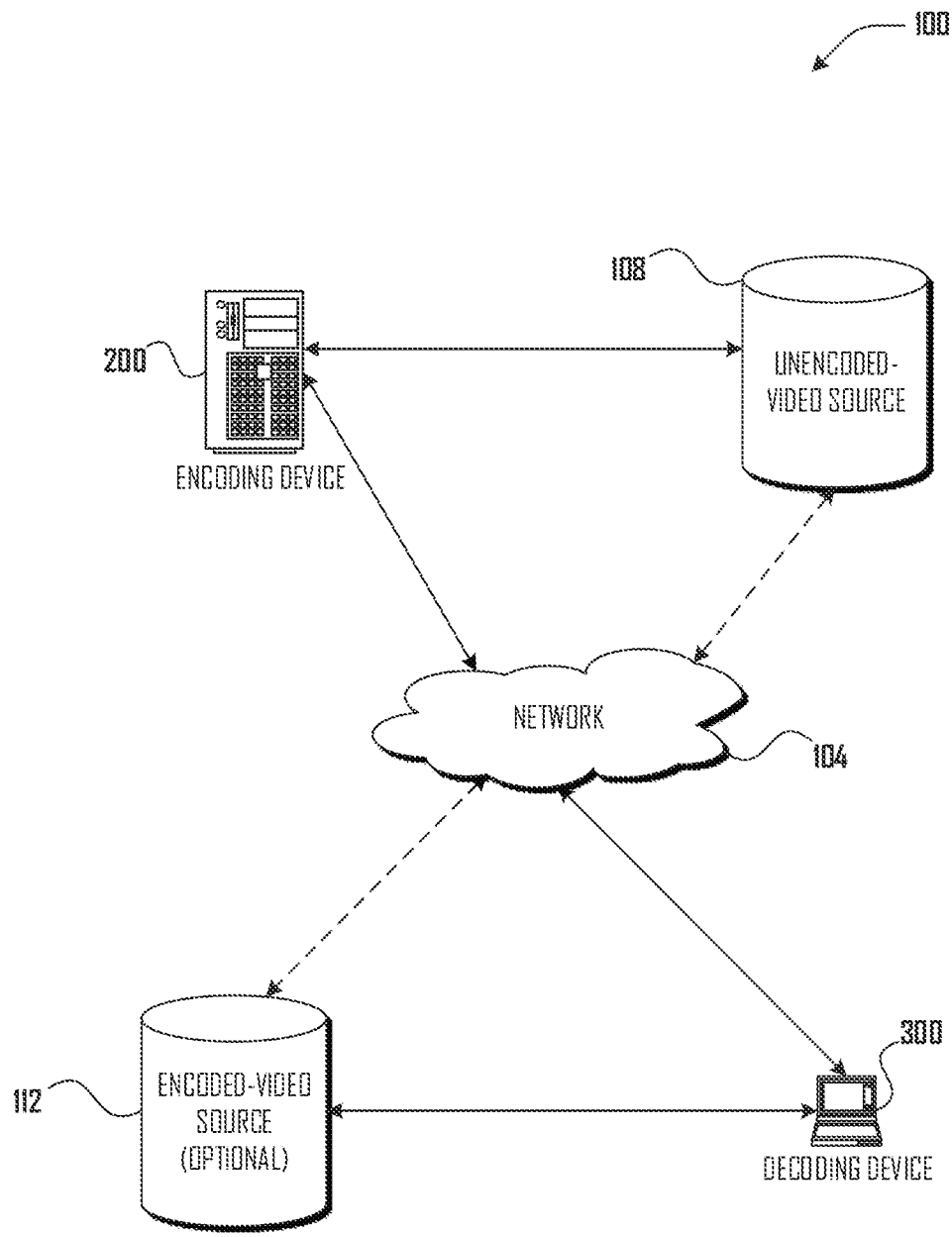
FIG. 1 illustrates an exemplary video encoding/decoding system according to at least one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers and memory storage devices. Each of these conventional distributed computing components is accessible by the processor via a communication network.

The phrases "in one embodiment," "in at least one embodiment," "in various embodiments," "in some embodiments," and the like may be used repeatedly herein. Such phrases do not necessarily refer to the same embodiment. The terms "comprising," "having," and "including" are synonymous, unless the context dictates otherwise. Various embodiments are described in the context of a typical "hybrid" video coding approach, as was described generally above, in that it uses inter-/intra-picture prediction and transform coding.

Reference is now made in detail to the description of the embodiments as illustrated in the drawings. While embodiments are described in connection with the drawings and related descriptions, it will be appreciated by those of ordinary skill in the art that alternate and/or equivalent implementations may be substituted for the specific embodiments shown and described, including all alternatives, modifications, and equivalents, whether or not explicitly illustrated and/or described, without departing from the scope of the present disclosure. In various alternate embodiments, additional devices, or combinations of illustrated devices, may be added to, or combined, without limiting the scope to the embodiments disclosed herein.

Exemplary Video Encoding/Decoding System

FIG. 1 illustrates an exemplary video encoding/decoding system 100 in accordance with at least one embodiment. Encoding device 200 (illustrated in FIG. 2 and described below) and decoding device 300 (illustrated in FIG. 3 and described below) are in data communication with a network 104. Encoding device 200 may be in data communication with unencoded video source 108, either through a direct data connection such as a storage area network ("SAN"), a high speed serial bus, and/or via other suitable communication technology, or via network 104 (as indicated by dashed lines in FIG. 1). Similarly, decoding device 300 may be in data communication with an optional encoded video source 112, either through a direct data connection, such as a storage area network ("SAN"), a high speed serial bus, and/or via other suitable communication technology, or via network 104 (as indicated by dashed lines in FIG. 1). In some embodiments, encoding device 200, decoding device 300, encoded-video source 112, and/or unencoded-video source 108 may comprise one or more replicated and/or distributed physical or logical devices. In many embodiments, there may be more encoding devices 200, decoding devices 300, unencoded-video sources 108, and/or encoded-video sources 112 than are illustrated.

In various embodiments, encoding device 200, may be a networked computing device generally capable of accepting requests over network 104, e.g. from decoding device 300, and providing responses accordingly. In various embodiments, decoding device 300 may be a networked computing device having a form factor such as a handheld device (mobile phone, e.g.), a wearable computing device (a watch or heads-up display, e.g.); a dedicated media player; a computing tablet; a motor vehicle head unit; an audio-video on demand (AVOD) system; a dedicated media console; a gaming device; a "set-top box;" a digital video recorder; a television; or a general purpose computer. In various embodiments, network 104 may include the Internet, one or more local area networks ("LANs"), one or more wide area networks ("WANs"), cellular data networks, and/or other data networks. Network 104 may, at various points, be a wired and/or wireless network.

Exemplary Encoding Device

Figure 2:
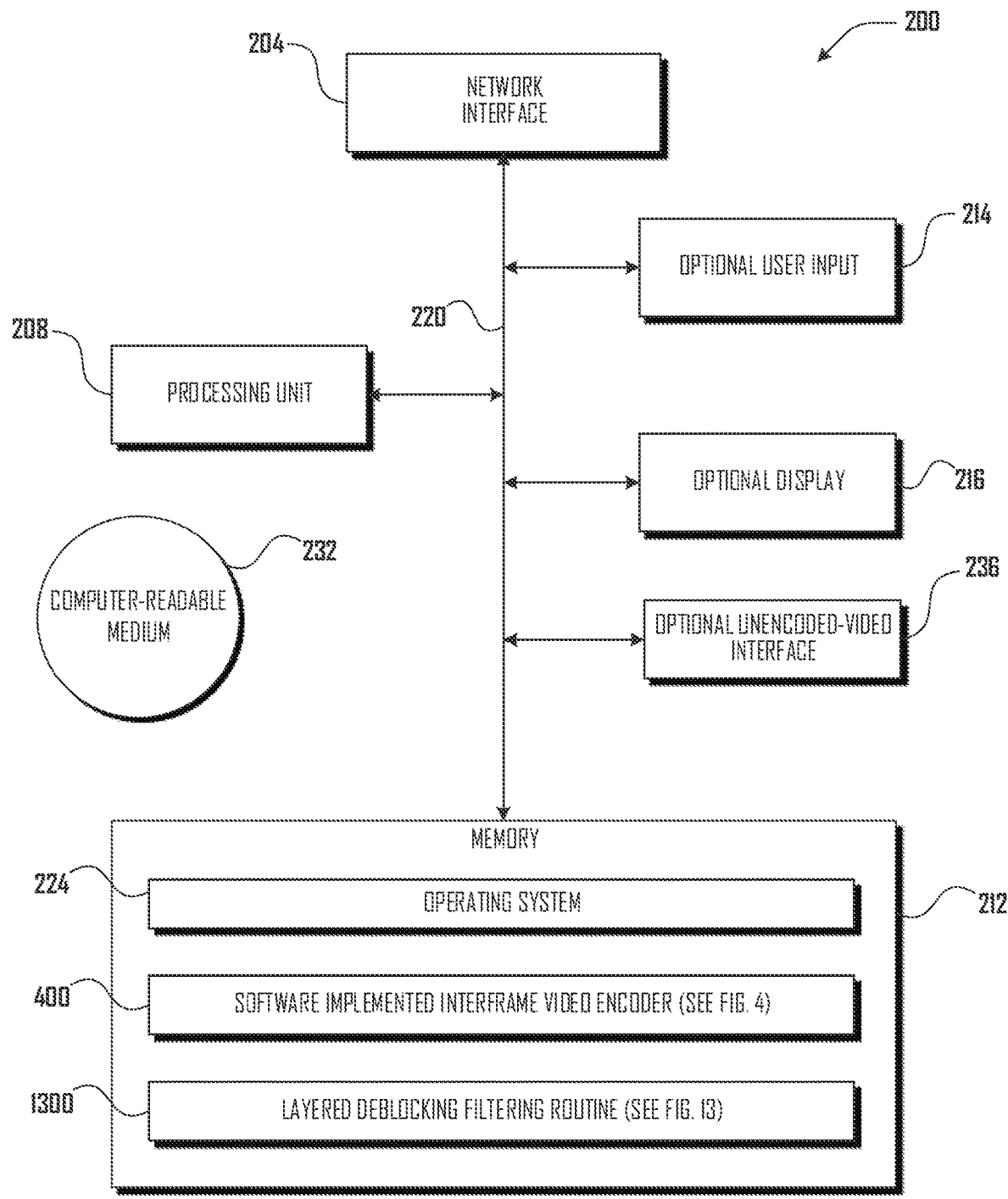
FIG. 2 illustrates several components of an exemplary encoding device, in accordance with at least one embodiment.

Referring to FIG. 2, several components of an exemplary encoding device 200 are illustrated. In some embodiments, an encoding device may include many more components than those shown in FIG. 2. However, it is not necessary that all of these generally conventional components be shown in order to disclose an illustrative embodiment. As shown in FIG. 2, exemplary encoding device 200 includes a network interface 204 for connecting to a network, such as network 104. Exemplary encoding device 200 also includes a processing unit 208 (implementing a general purpose processor, e.g.), a memory 212, an optional user input 214 (e.g. an alphanumeric keyboard, keypad, a mouse or other pointing device, a touchscreen, and/or a microphone), and an optional display 216, all interconnected along with the network interface 204 via a bus 220. The memory 212 generally comprises a RAM, a ROM, and a permanent mass storage device, such as a disk drive, flash memory, or the like.

The memory 212 of exemplary encoding device 200 stores an operating system 224 as well as program code for a number of software services, such as software implemented interframe video encoder 400 (described below in reference to FIG. 4) with instructions for performing a transform-block-processing routine 900 (described below in reference to FIG. 9). Memory 212 may also store video data files (not shown) which may represent unencoded copies of audio/visual media works, such as, by way of examples, movies and/or television episodes. These and other software components may be loaded into memory 212 of encoding device 200 using a drive mechanism (not shown) associated with a non-transitory computer-readable medium 232, such as a floppy disc, tape, DVD/CD-ROM drive, USB drive, memory card, or the like.

In operation, the operating system 224 manages the hardware and other software resources of the encoding device 200 and provides common services for software applications, such as software implemented interframe video encoder 400. For hardware functions such as network communications via network interface 204, receiving data via input 214, outputting data via optional display 216, and allocation of memory 212 for various software applications, such as software implemented interframe video encoder 400, operating system 224 acts as an intermediary between software executing on the encoding device and the hardware.

In some embodiments, encoding device 200 may further comprise a specialized unencoded video interface 236 for communicating with unencoded-video source 108, such as a high speed serial bus, or the like. In some embodiments, encoding device 200 may communicate with unencoded-video source 108 via network interface 204. In other embodiments, unencoded-video source 108 may reside in memory 212 or computer readable medium 232.

Although an exemplary encoding device 200 has been described that generally conforms to conventional general purpose computing devices, an encoding device 200 may be any of a great number of devices capable of executing instructions for encoding video in accordance with various embodiments, such as exemplary software implemented interframe video encoder 400, and transform-block-processing routine 900, for example, a video recording device, a video co-processor and/or accelerator, a personal computer, a game console, a set-top box, a handheld or wearable computing device, a smart phone, or any other suitable device.

Encoding device 200 may, by way of example, be operated in furtherance of an on-demand media service (not shown). In at least one exemplary embodiment, the on-demand media service may be operating encoding device 200 in furtherance of an online on-demand media store providing digital copies of media works, such as video content, to users on a per-work and/or subscription basis. The on-demand media service may obtain digital copies of such media works from unencoded video source 108.

Exemplary Decoding Device

Figure 3:
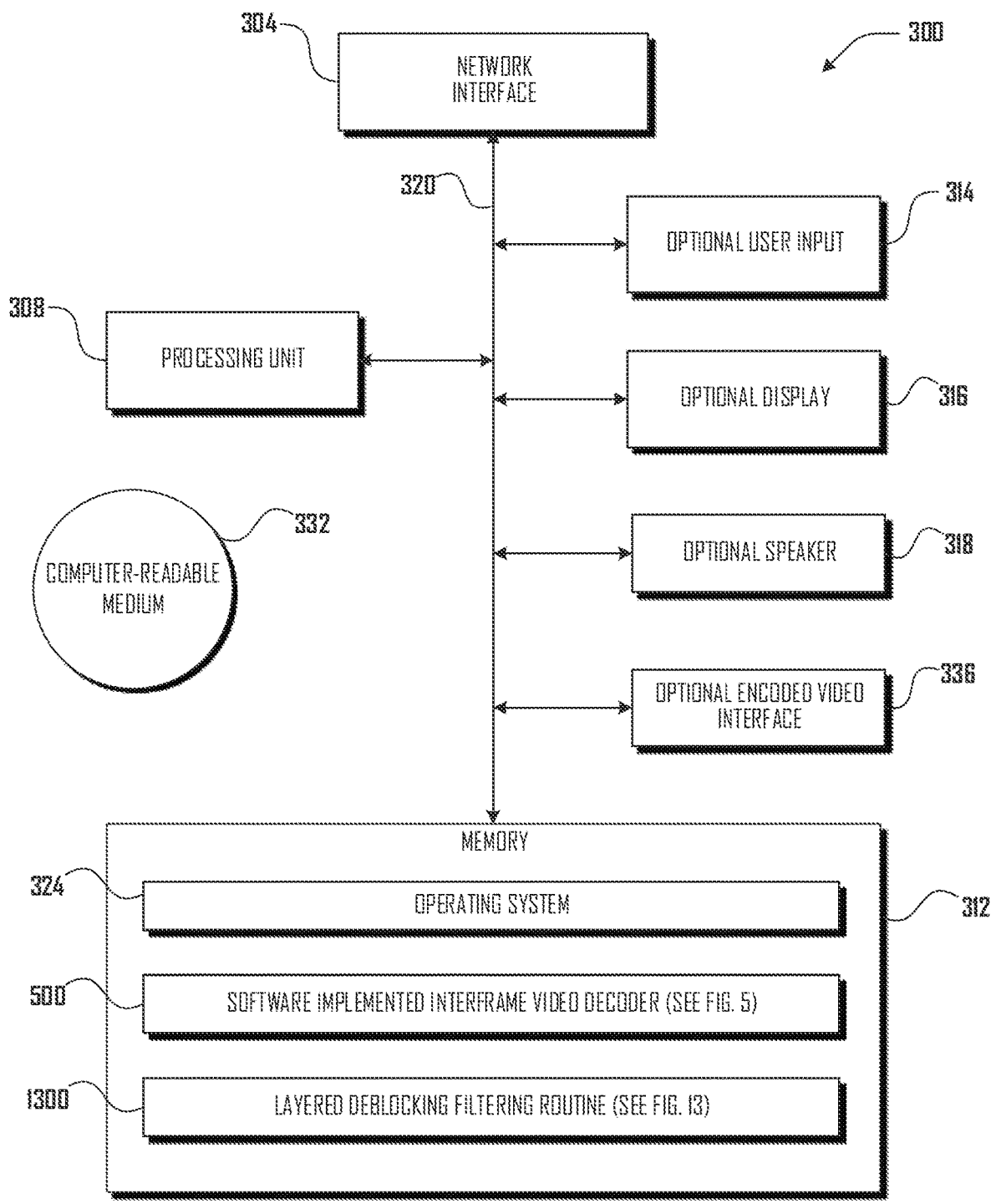
FIG. 3 illustrates several components of an exemplary decoding device, in accordance with at least one embodiment.

Referring to FIG. 3, several components of an exemplary decoding device 300 are illustrated. In some embodiments, a decoding device may include many more components than those shown in FIG. 3. However, it is not necessary that all of these generally conventional components be shown in order to disclose an illustrative embodiment. As shown in FIG. 3, exemplary decoding device 300 includes a network interface 304 for connecting to a network, such as network 104. Exemplary decoding device 300 also includes a processing unit 308 (implementing a general purpose processor, e.g.), a memory 312, an optional user input 314 (e.g. an alphanumeric keyboard, keypad, a mouse or other pointing device, a touchscreen, and/or a microphone), an optional display 316, and an optional speaker 318, all interconnected along with the network interface 304 via a bus 320. The memory 312 generally comprises a RAM, a ROM, and a permanent mass storage device, such as a disk drive, flash memory, or the like.

The memory 312 of exemplary decoding device 300 may store an operating system 324 as well as program code for a number of software services, such as software implemented interframe video decoder 500 (described below in reference to FIG. 5) with instructions for performing a transform-block-recovery routine (described in International Patent Application PCT/CN2015/075597, entitled "Residual transformation and inverse transformation in video coding systems and methods" and filed on 31 Mar. 2015). Memory 312 may also store video data files (not shown) which may represent encoded copies of audio/visual media works, such as, by way of example, movies and/or television episodes. These and other software components may be loaded into memory 312 of decoding device 300 using a drive mechanism (not shown) associated with a non-transitory computer-readable medium 332, such as a floppy disc, tape, DVD/CD-ROM drive, memory card, or the like.

In operation, the operating system 324 manages the hardware and other software resources of the decoding device 300 and provides common services for software applications, such as software implemented interframe video decoder 500. For hardware functions such as network communications via network interface 304, receiving data via input 314, outputting data via optional display 316 and/or optional speaker 318, and allocation of memory 312, operating system 324 acts as an intermediary between software executing on the encoding device and the hardware.

In some embodiments, decoding device 300 may further comprise an optional encoded video interface 336, e.g. for communicating with encoded-video source 112, such as a high speed serial bus, or the like. In some embodiments, decoding device 300 may communicate with an encoded-video source, such as encoded video source 112, via network interface 304. In other embodiments, encoded-video source 112 may reside in memory 312 or computer readable medium 332.

Although an exemplary decoding device 300 has been described that generally conforms to conventional general purpose computing devices, an decoding device 300 may be any of a great number of devices capable of executing instructions for decoding video in accordance with various embodiments, such as exemplary software implemented interframe video decoder 500, and transform-blocksize-selection sub-routine 1000, for example, a video recording device, a video co-processor and/or accelerator, a personal computer, a game console, a set-top box, a handheld or wearable computing device, a smart phone, or any other suitable device.

Decoding device 300 may, by way of example, be operated in cooperation with the on-demand media service. In at least one exemplary embodiment, the on-demand media service may provide digital copies of media works, such as video content, to a user operating decoding device 300 on a per-work and/or subscription basis. The decoding device may obtain digital copies of such media works from unencoded video source 108 via, for example, encoding device 200 via network 104.

Software Implemented Interframe Video Encoder

Figure 4:
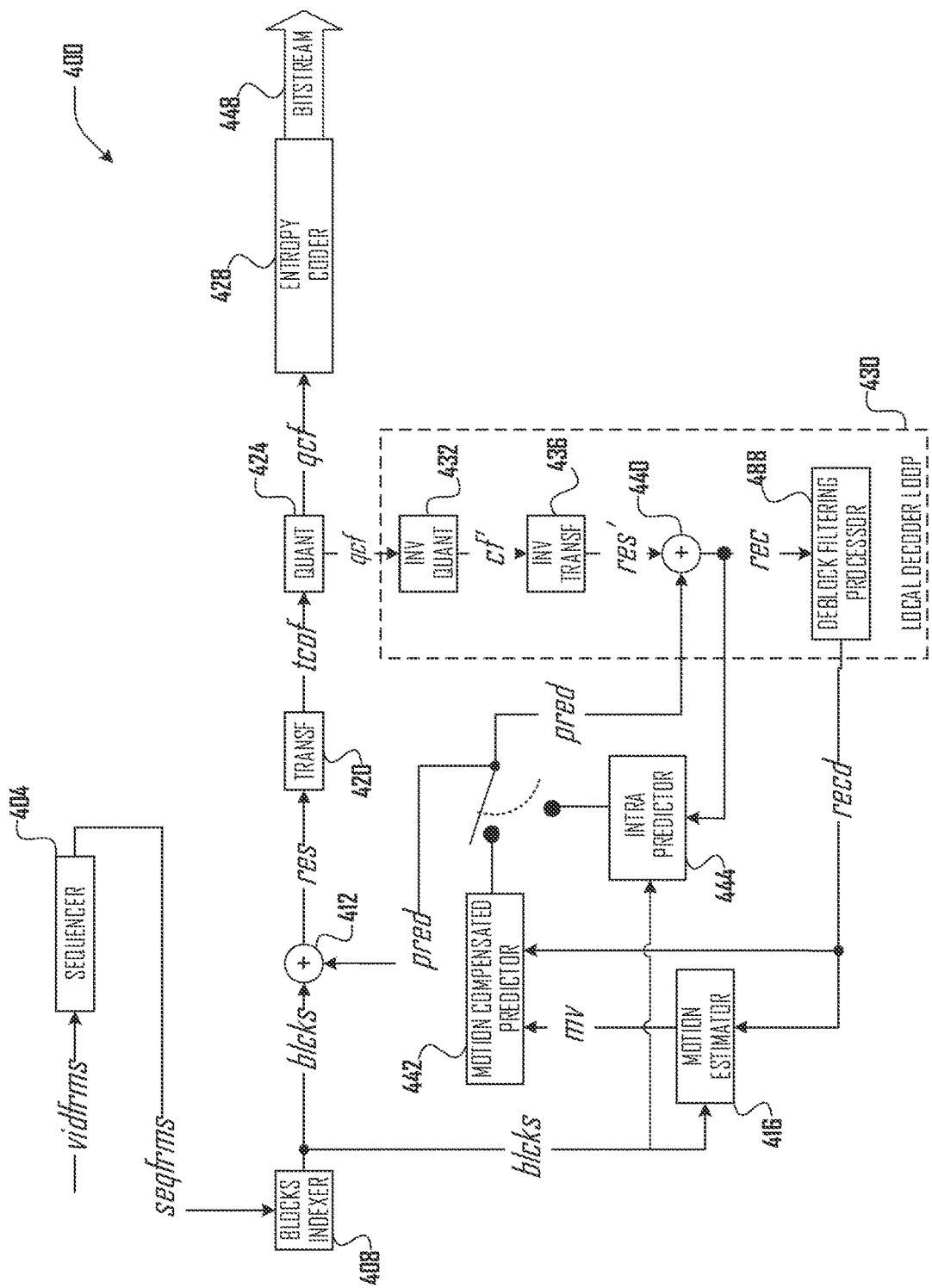
FIG. 4 illustrates a block diagram of an exemplary video encoder in accordance with at least one embodiment.

FIG. 4 shows a general functional block diagram of software implemented interframe video encoder 400 (hereafter "encoder 400") employing residual transformation techniques in accordance with at least one embodiment. One or more unencoded video frames (vidfrms) of a video sequence in display order may be provided to sequencer 404.

Sequencer 404 may assign a predictive-coding picture-type (e.g. I, P, or B) to each unencoded video frame and reorder the sequence of frames, or groups of frames from the sequence of frames, into a coding order for motion prediction purposes (e.g. I-type frames followed by P-type frames, followed by B-type frames). The sequenced unencoded video frames (seqfrms) may then be input in coding order to blocks indexer 408.

For each of the sequenced unencoded video frames (seqfrms), blocks indexer 408 may determine a largest coding block ("LCB") size for the current frame (e.g. sixty-four by sixty-four pixels) and divide the unencoded frame into an array of coding blocks (blcks). Individual coding blocks within a given frame may vary in size, e.g. from four by four pixels up to the LCB size for the current frame.

Each coding block may then be input one at a time to differencer 412 and may be differenced with corresponding prediction signal blocks (pred) generated from previously encoded coding blocks (CB's). To generate the prediction blocks (pred), coding blocks (blcks) are also to be provided to motion estimator 416. After differencing at differencer 412, a resulting residual block (res) may be forward-transformed to a frequency-domain representation by transformer 420 (discussed below), resulting in a block of transform coefficients (tcof). The block of transform coefficients (tcof) may then be sent to the quantizer 424 resulting in a block of quantized coefficients (qcf) that may then be sent both to an entropy coder 428 and to a local decoding loop 430.

At the beginning of local decoding loop 430, inverse quantizer 432 may de-quantize the block of transform coefficients (tcof) and pass them to inverse transformer 436 to generate a de-quantized residual block (res'). At adder 440, a prediction block (pred) from motion compensated predictor 442 or intra predictor 444 may be added to the de-quantized residual block (res') to generate a locally decoded block (rec). Locally decoded block (rec) may then be sent to a frame assembler and deblock filter processor 488, which reduces blockiness and assembles a recovered frame (recd), which may be used as the reference frame for motion estimator 416 and motion compensated predictor 442. After adder 440, rec may be used as the reference pixels to generate intra predictor. Intra predictor is useful when the prediction block has strong context with its neighboring blocks.

Entropy coder 428 encodes the quantized transform coefficients (qcf), differential motion vectors (dmv), and other data, generating an encoded video bit-stream 448. For each frame of the unencoded video sequence, encoded video bit-stream 448 may include encoded picture data (e.g. the encoded quantized transform coefficients (qcf) and differential motion vectors (dmv)) and an encoded frame header (e.g. syntax information such as the LCB size for the current frame).

Forward Integer Transform Procedures

Referring to the functionality of transformer 420, the transformer receives a block of residual values for each coding block's luma and chroma values and divides the block of residual values into one or more luma and chroma transform blocks.

In at least one embodiment, a coding block is divided into transform blocks sized according to the current coding block size as well as the size of the one or more prediction blocks (PB's) used for motion compensation or intra prediction for the coding block. For example, transform block (TB) size may be assigned according to the combinations shown in FIG. 10. Transformer 420 may also set a maximum-transform-block-size flag in the picture header for the current frame.

After a coding block is divided into transform blocks, the residual values in the transform blocks are converted from the spatial domain to the frequency domain, for example via a forward DCT transform operation. In at least one embodiment, in order to increase coding efficiency, integer equivalents of the transform block's residual values are obtained and a forward integer DCT transform operation may be performed. In order to further increase coding efficiency, it may be advantageous to utilize a single-instruction-multiple-data (SIMD) instruction architecture in the video coding process. However, most common implementations of SIMD instruction architecture require a bit-width of sixteen bits. Therefore, in at least one embodiment, bit-shifting operations may be performed on the residual values after some forward transformation operations (and, on the decoder side, on the transform coefficients after some inverse transformation operations) to ensure the residual values and transform coefficients may be represented by sixteen bit integers.

Software Implemented Interframe Decoder

Figure 5:
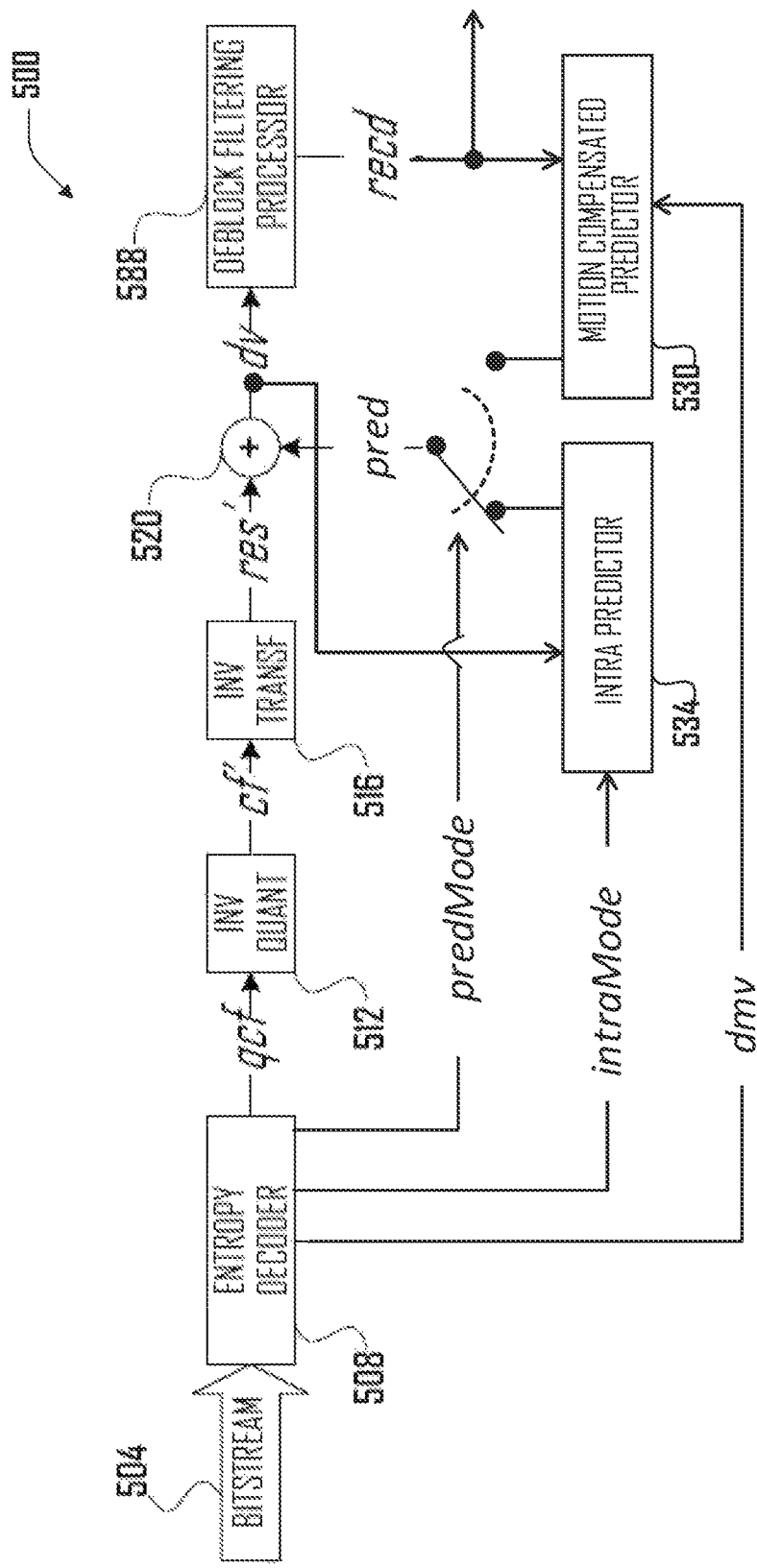
FIG. 5 illustrates a block diagram of an exemplary video decoder in accordance with at least one embodiment.

FIG. 5 shows a general functional block diagram of a corresponding software implemented interframe video decoder 500 (hereafter "decoder 500") inverse residual transformation techniques in accordance with at least one embodiment and being suitable for use with a decoding device, such as decoding device 300. Decoder 500 may work similarly to the local decoder loop 430 at encoder 400.

Specifically, an encoded video bit-stream 504 to be decoded may be provided to an entropy decoder 508, which may decode blocks of quantized coefficients (qcf), differential motion vectors (dmv), accompanying message data packets (msg-data), and other data. The quantized coefficient blocks (qcf) may then be inverse quantized by an inverse quantizer 512, resulting in de-quantized coefficients (cf). De-quantized coefficients (cf) may then be inverse transformed out of the frequency-domain by an inverse transformer 516 (described below), resulting in decoded residual blocks (res'). According to the prediction mode (predMode), an adder 520 may add the predictor (pred) which may be intra predictor 534 derived according to intra prediction mode (intraMode) by using the neighboring blocks before deblock filtering process or may be motion compensated predictor obtained by using corresponding motion vectors (mv). The resulting decoded video (dv) may be deblock-filtered in a frame assembler and deblock filtering processor 588. Blocks (recd) at the output of frame assembler and deblock filtering processor 588 form a reconstructed frame of the video sequence, which may be output from the decoder 500 and also may be used as the reference frame for a motion-compensated predictor 530 for decoding subsequent coding blocks.

Inverse Integer Transform Procedures

Referring to the functionality of inverse transformer 516, the inverse transformer obtains blocks of de-quantized sixteen-bit integer transform coefficients from inverse quantizer 512. The inverse transformer 516 performs an inverse integer DCT transform operation on the transform coefficients obtained from inverse quantizer 512 in order to reverse the forward integer DCT transform operation performed by transformer 420, described above, and recover the residual values. Further information concerning such implementations may be found in International Patent Application PCT/CN2015/075597 ("Residual transformation and inverse transformation in video coding systems and methods"), filed on 31 Mar. 2015.

Horizontally Adjacent Blocks

Figure 6:
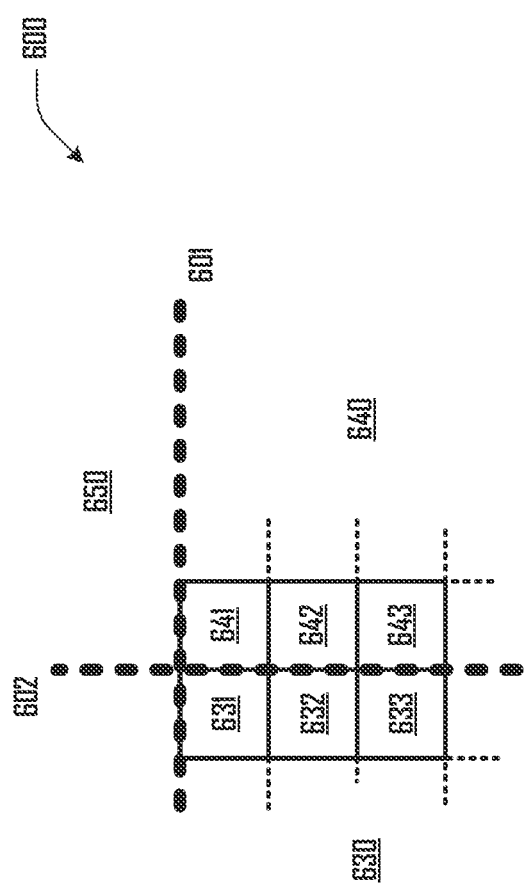
FIG. 6 illustrates a region of an image to be processed in accordance with at least one embodiment.

FIG. 6 illustrates a region 600 (a picture or frame, e.g.) that includes several pixels 641, 642, 643 of a current subblock/block 640 adjacent several pixels 631, 632, 633 of a neighboring subblock/block 630, the blocks 630, 640 optionally being of the same size (both 8×8 or both 16×16, e.g.). In respective variants, such current and neighboring blocks may correspond to 4×4 or larger coding blocks, prediction blocks, or transform blocks (described below in regard to FIG. 6, for example). Blocks 630, 640 may (optionally) be consecutive transform blocks both bounded by a horizontal boundary 601 along their respective tops and a vertical boundary 602 therebetween. The current block 640 is also adjacent a neighboring block 650 above, as shown. Blocky artifacts (sharp transitions that have apparently resulted from quantization or other aspects of image compression, e.g.) observable across one or more boundaries 601, 602 of block 640 are mitigated with deblocking filtering as described herein.

Vertically Adjacent Blocks

Figure 7:
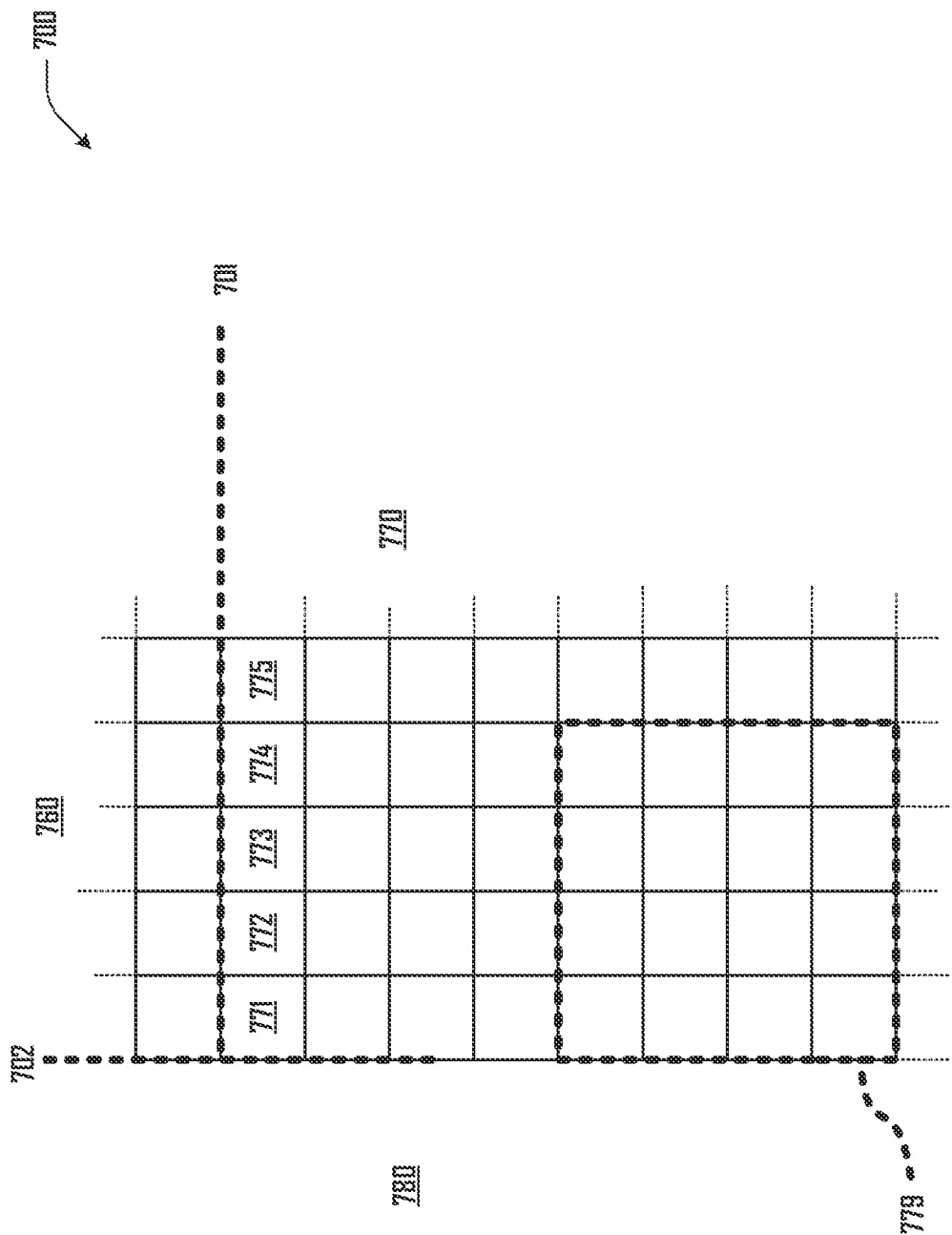
FIG. 7 also illustrates a region of an image to be processed in accordance with at least one embodiment.

FIG. 7 illustrates a region 700 (of a picture or frame, e.g.) that includes several pixels 771, 772, 773, 774, 775 of a current block 770 adjacent pixels of a neighboring block 760, optionally of the same size (8×8 or 16×16, e.g.). Such current and neighboring blocks may correspond to coding blocks, prediction blocks, or transform blocks to which reference is made in FIG. 6, for example. Both blocks 760, 770 are bounded by a horizontal boundary 701 therebetween and a vertical boundary 702 along their respective left sides, as shown. In some variants block 770 may be an instance of block 640 and accordingly may be adjacent another image region 780 of interest (a slice or neighboring block 630 of region 700, e.g.). Alternatively or additionally, block 770 may include a subblock having a blocksize 779 of 4 pixels by 4 pixels, as shown.

Corner Blocks

Figure 8:
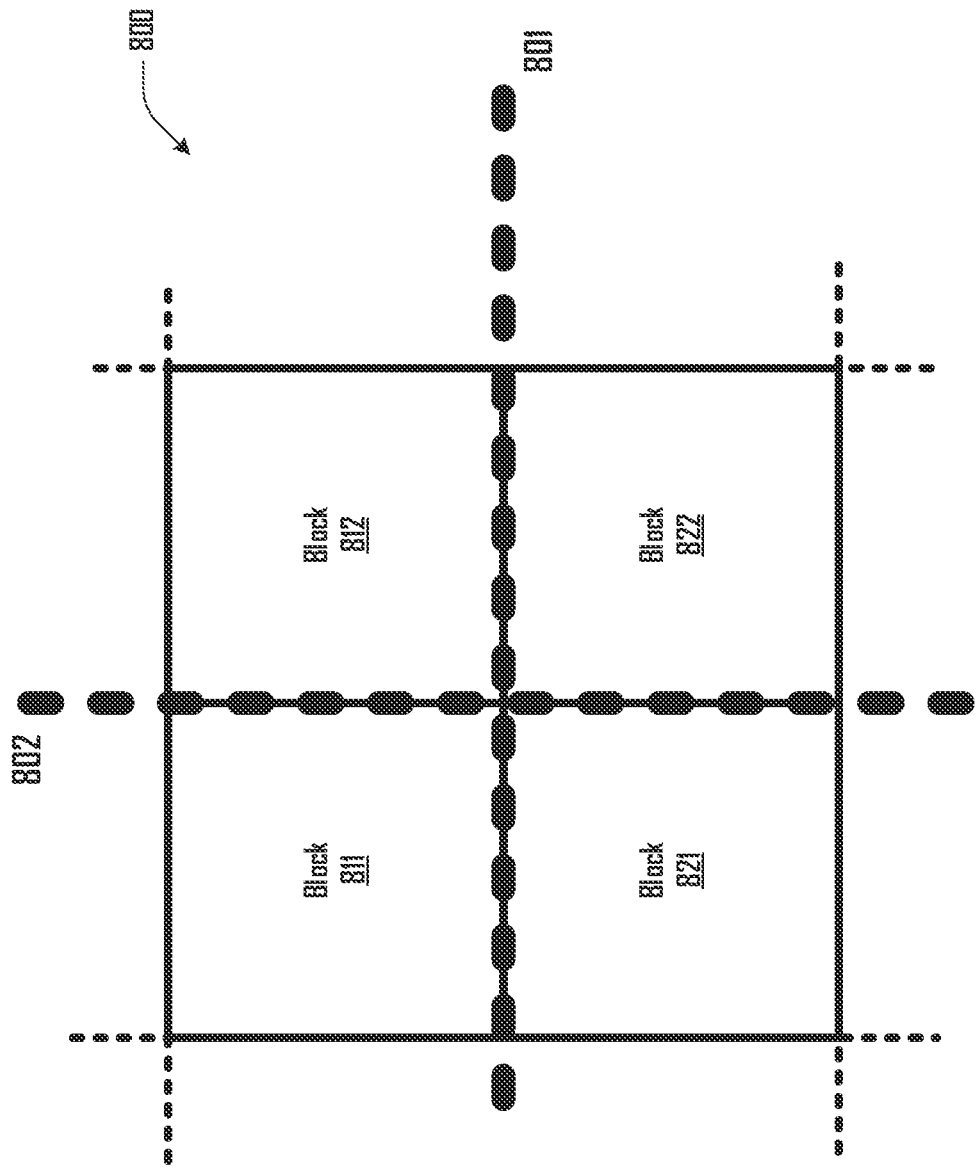
FIG. 8 also illustrates a region of an image to be processed in accordance with at least one embodiment.

FIG. 8 illustrates a region 800 (of a picture or frame, e.g.) in which a current block 822 is divided from a vertically adjacent neighboring block 812, a horizontally adjacent neighboring block 821, and a diagonally adjacent block 811 by a pair of linear boundaries 801, 802 as shown. All four such blocks 811, 812, 821, 822 also have other attributes in common (all being a coding or transform block, e.g.) as described herein. Moreover the current block 822 may instantiate one or more of block 640 or block 770 in some variants.

Transform-Block-Processing-Routine

Figure 9:
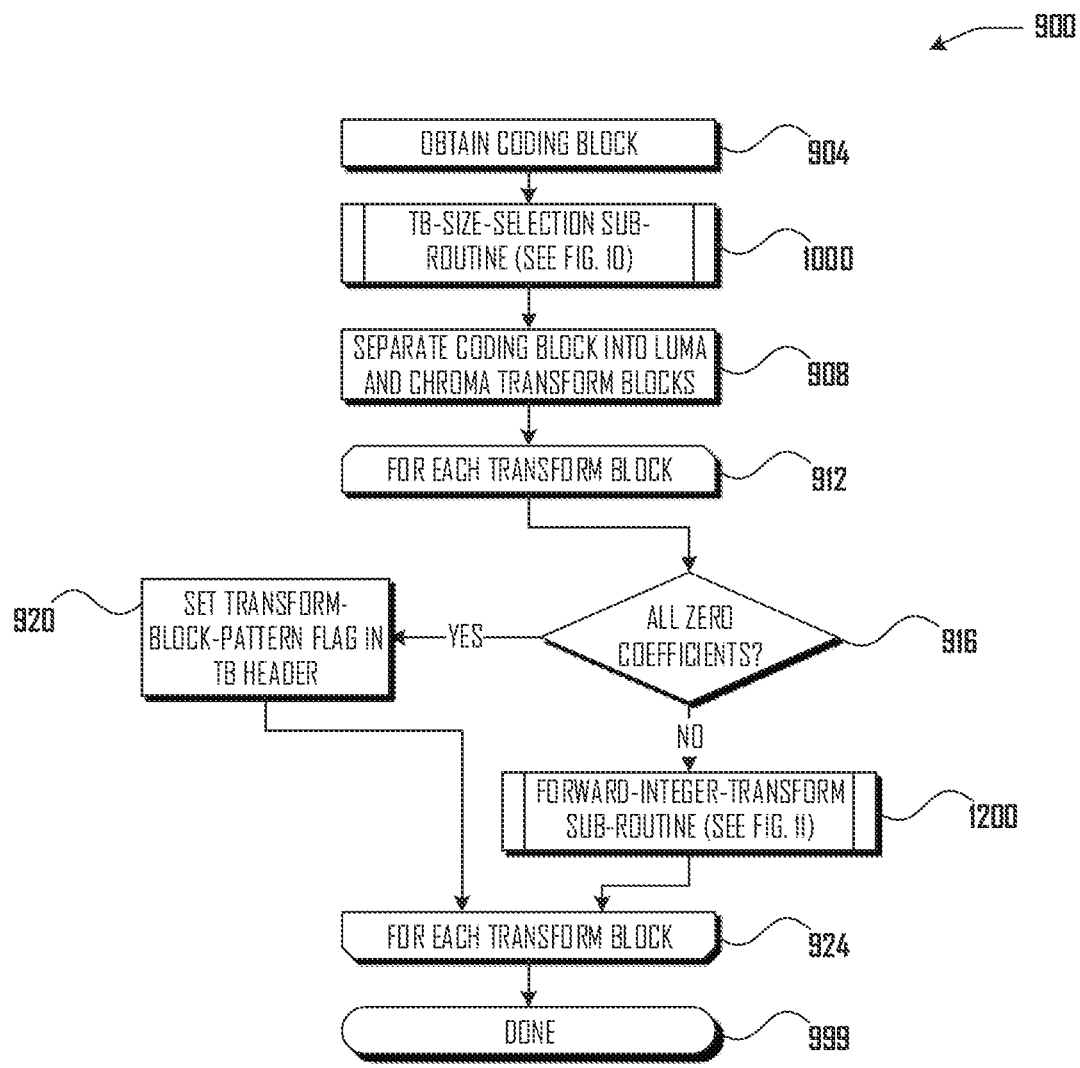
FIG. 9 illustrates a transform-block-processing routine in accordance with at least one embodiment.

FIG. 9 illustrates a transform-block-processing routine 900 suitable for use with at least one embodiment, such as an instance of encoder 400 or decoder 500 as described herein.

At execution block 904, transform-block-processing routine 900 obtains a coding block of integer residual values for current frame being encoded. Transform-block-processing routine 900 then provides the size of the current coding block and the size of the corresponding prediction blocks used in motion estimation to transform-blocksize-selection sub-routine 1000 (described below in reference to FIG. 10), which returns appropriate chroma and luma transform block sizes for the current combination of current coding block size and prediction block size.

At execution block 908, transform-block-processing routine 900 then separates the current coding block into one or more transform blocks of sixteen-bit integer residual values according to the chroma and luma transform block sizes returned by transform-blocksize-selection sub-routine 1000, above.

At starting loop block 912, each transform block of the current coding block is processed in turn.

At decision block 916, if each of the residual values of the current transform block has a zero value, then at execution block 920, transform-block-processing routine 900 sets a corresponding transform-block-pattern flag in the transform block header of the current transform block.

Otherwise, at decision block 916, if one or more of the residual values of the current transform block has a non-zero value, then transform-block-processing routine 900 calls forward-integer-transform sub-routine 1100 (described below in reference to FIG. 11), which returns a corresponding block of sixteen-bit integer transform coefficients.

At ending loop block 924, transform-block-processing routine 900 iterates back to starting loop block 912 to process the next transform block of the current coding block (if any), then transform-block-processing routine 900 ends for the current coding block at termination block 999.

Transform-Blocksize-Selection Sub-Routine

Figure 10:
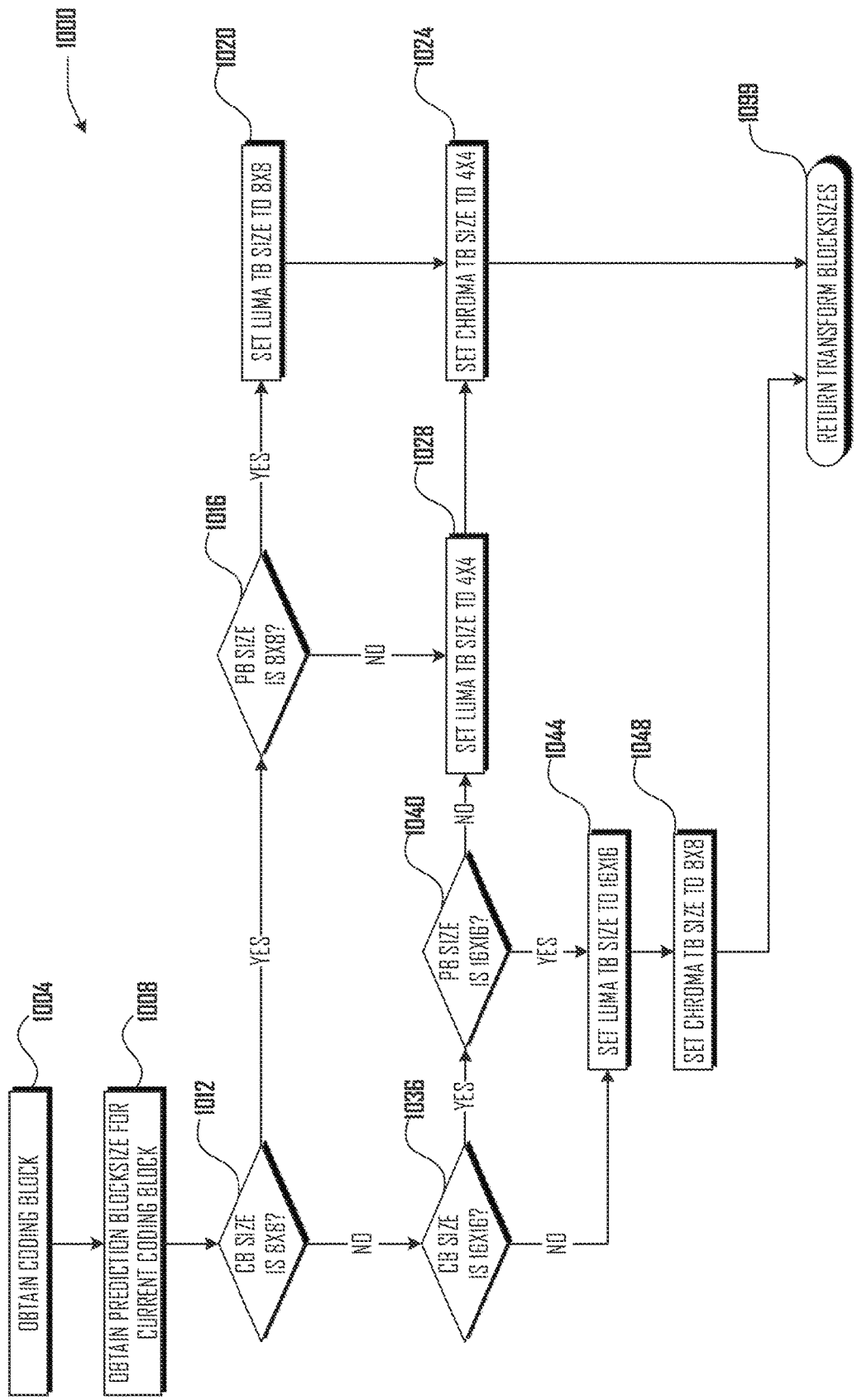
FIG. 10 illustrates a transform-blocksize-selection sub-routine in accordance with at least one embodiment.

FIG. 10 illustrates a transform-blocksize-selection sub-routine 1000 suitable for use with at least one embodiment, such as transform-block-processing routine 900.

At execution blocks 1004 and 1008, transform-blocksize-selection sub-routine 1000 obtains the coding block size and the prediction block size used for the motion estimation process of the current coding block.

At decision block 1012, if the coding block size of the current coding block is 8×8 pixels, then transform-block-size-selection sub-routine 1000 proceeds to decision block 1016.

At decision block 1016, if the prediction block size for the current coding block is 8×8 pixels, then at execution block 1020, transform-blocksize-selection sub-routine 1000 sets the luma transform block size for the current coding block to 8×8 luma transform coefficients and, at execution block 1024, transform-blocksize-determination sub-routine sets the chroma transform block size for the current coding block to 4×4 chroma transform coefficients. Transform-blocksize-determination sub-routine then returns the luma transform block size and the chroma transform block size for the current coding block at return block 1099.

Referring again to decision block 1016, if the prediction block size for the current coding block is not 8×8 pixels, then at execution block 1028, transform-blocksize-selection sub-routine 1000 sets the luma transform block size for the current coding block to 4×4 luma transform coefficients. Transform-blocksize-selection sub-routine 1000 then proceeds to execution block 1024. As described above, at execution block 1024, transform-blocksize-determination sub-routine sets the chroma transform block size for the current coding block to 4×4 chroma transform coefficients. Transform-blocksize-selection sub-routine 1000 then returns the luma transform block size and the chroma transform block size for the current coding block at return block 1099.

Referring again to decision block 1012, if the coding block size for the current coding block is not 8×8 pixels, transform-blocksize-selection sub-routine 1000 proceeds to decision block 1036.

At decision block 1036, if the coding block size for the current coding block is 16×16 pixels, then transform-blocksize-selection sub-routine 1000 proceeds to decision block 1040.

At decision block 1040, if the prediction block size for the current coding block is 16×16 pixels, then at execution block 1044, transform-blocksize-selection sub-routine 1000 sets the luma transform block size for the current coding block to 16×16 luma transform coefficients, and, at execution block 1048, transform-blocksize-determination sub-routine then sets the chroma transform block size for the current coding block to 8×8 chroma transform coefficients. Transform-blocksize-determination sub-routine then returns the luma transform block size and the chroma transform block size for the current coding block at return block 1099.

Referring again to decision block 1040, if the prediction block size for the current coding block is not 16×16 pixels, then transform-blocksize-selection sub-routine 1000 proceeds to execution block 1028. As described above, at execution block 1028, transform-blocksize-selection sub-routine 1000 sets the luma transform block size for the current coding block to 4×4 luma transform coefficients. Transform-blocksize-selection sub-routine 1000 then proceeds to execution block 1024. As described above, at execution block 1024, transform-blocksize-determination sub-routine sets the chroma transform block size for the current coding block to 4×4 chroma transform coefficients. Transform-blocksize-determination sub-routine then returns the luma transform block size and the chroma transform block size for the current coding block at return block 1099.

Referring again to decision block 1036, if the coding block size for the current coding block is not 16×16 pixels, then transform-blocksize-selection sub-routine 1000 proceeds to execution block 1044. As described above, at execution block 1044, transform-blocksize-selection sub-routine 1000 sets the luma transform block size for the current coding block to 16×16 luma transform coefficients, and, at execution block 1048, transform-blocksize-determination sub-routine then sets the chroma transform block size for the current coding block to 8×8 chroma transform coefficients. Transform-blocksize-determination sub-routine then returns the luma transform block size and the chroma transform block size for the current coding block at return block 1099.

Forward-Integer-Transform Sub-Routine

Figure 11:
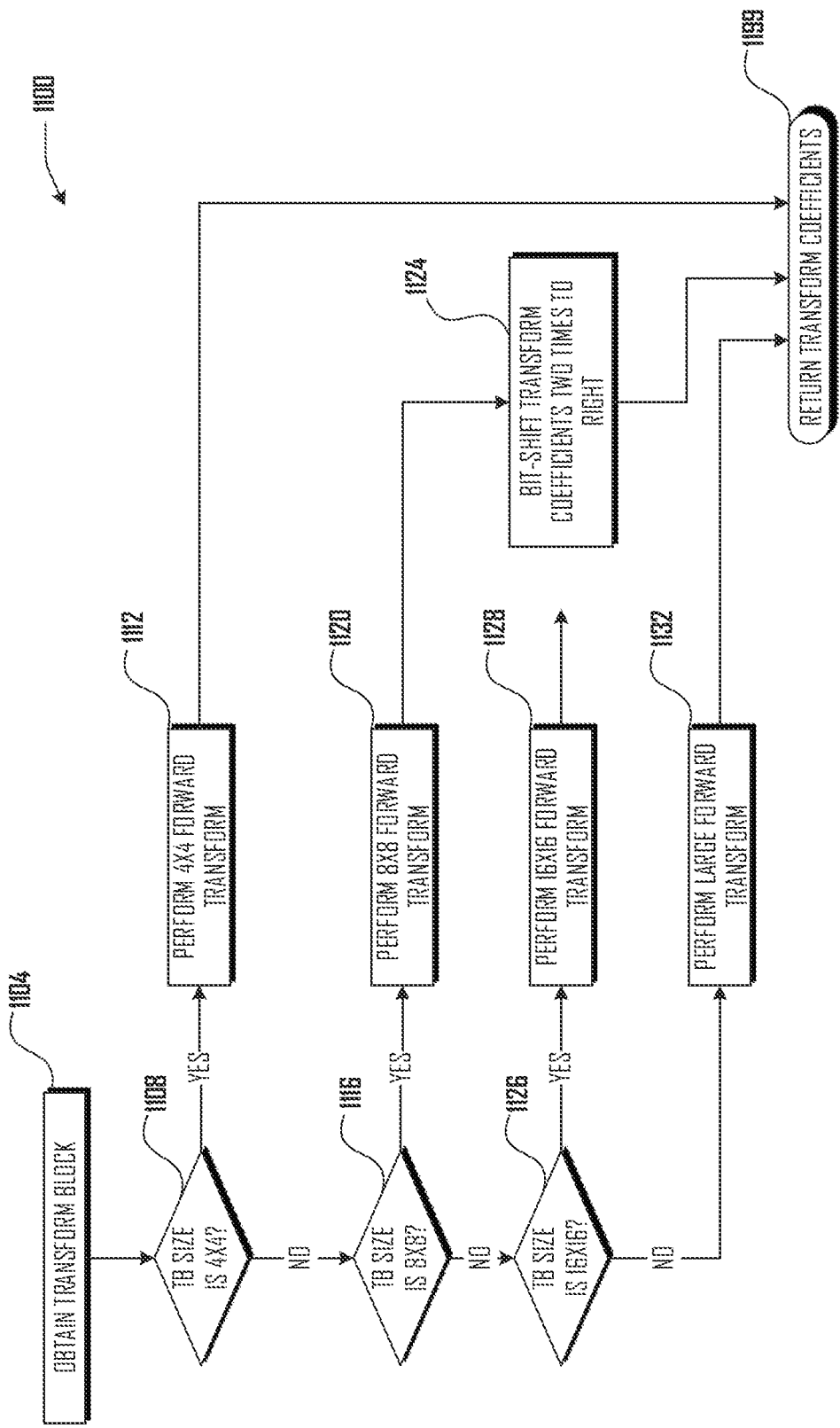
FIG. 11 illustrates a forward-integer-transform sub-routine in accordance with at least one embodiment.

FIG. 11 illustrates a forward-integer-transform sub-routine 1100 suitable for use with at least one embodiment, such as transform-block-processing routine 900.

At execution block 1104, forward-integer-transform sub-routine obtains a transform block, for example from transform-block-processing routine 900.

At decision block 1108, if the current transform block is a 4×4 block of integer transform coefficients, then at execution block 1112, forward-integer-transform sub-routine 1100 performs a 4×4 forward transform, for example the 4×4 forward integer transform operation described above. Forward-integer-transform sub-routine 1100 then returns the transform coefficients obtained via the 4×4 integer transform at return block 1199.

Referring again to decision block 1108, if the current transform block is not a 4×4 block of integer transform coefficients, for example an 8×8, a 16×16, a 32×32, or a 64×64 block of integer transform coefficients, then forward-integer-transform sub-routine 1100 proceeds to decision block 1116.

At decision block 1116, if the current transform block is an 8×8 block of integer transform coefficients, then at execution block 1120, forward-integer-transform sub-routine 1100 performs an 8×8 forward transform, for example the 8×8 forward integer transform operation described above. At execution block 1124, forward-integer-transform sub-routine 1100 manipulates the transform coefficients obtained via the 8×8 integer transform at execution block 1120, bit-shifting the transform coefficients twice to the right in order to ensure the transform coefficients may be represented by no more than sixteen bits. Forward-integer-transform sub-routine 1100 returns the bit-shifted transform coefficients at return block 1199.

Referring again to decision block 1116, if the current transform block is not an 8×8 block of integer transform coefficients (for example, if it is a 16×16, a 32×32 or 64×64 block of integer transform coefficients), then forward-integer-transform sub-routine 1100 proceeds to decision block 1126.

At decision block 1126, if the current transform block is a 16×16 block of integer transform coefficients, then at execution block 1128, forward-integer-transform sub-routine 1100 performs a 16×16 forward transform, for example the 16×16 forward integer transform operation described above. Forward-integer-transform sub-routine 1100 then proceeds to execution block 1124. As described above, at execution block 1124, forward-integer-transform sub-routine 1100 manipulates the transform coefficients obtained via the 8×8 integer transform at execution block 1120, bit-shifting the transform coefficients twice to the right in order to ensure the transform coefficients may be represented by no more than sixteen bits. Forward-integer-transform sub-routine 1100 returns the bit-shifted transform coefficients at return block 1199.

Referring again to decision block 1126, if the current transform block is larger than a 16×16 block of integer transform coefficients, for example a 32×32 or 64×64 block of integer transform coefficients, then at execution block 1132, forward-integer-transform sub-routine 1100 performs a large-transform procedure. Forward-integer-transform sub-routine 1100 returns the results of the large integer transform procedure at return block 1199.

Picture-Processing Routine

Figure 12:
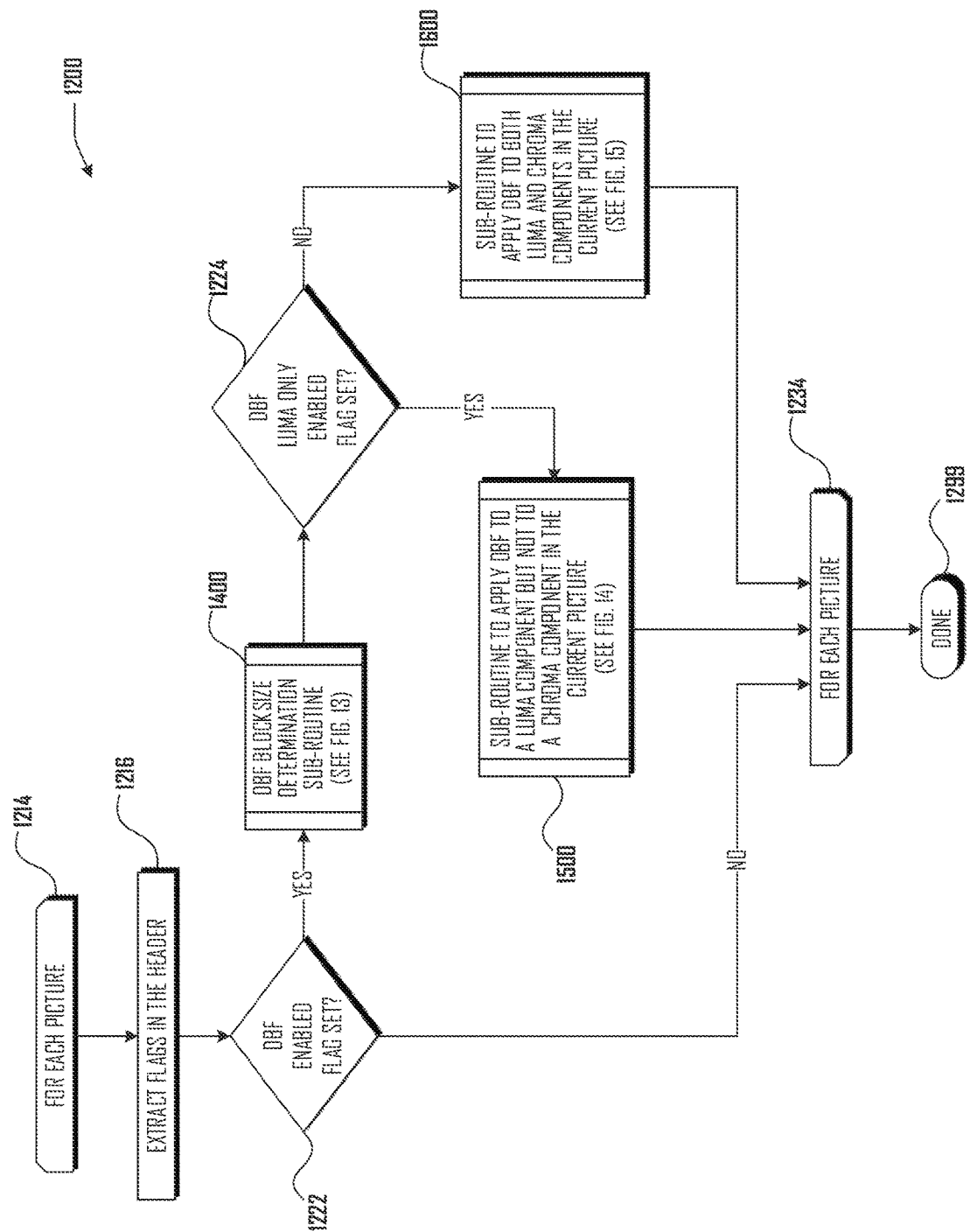
FIG. 12 illustrates a picture-processing routine in accordance with at least one embodiment.

FIG. 12 illustrates a picture-processing routine 1200 suitable for use with at least one embodiment, such as an instance of encoder 400 or decoder 500 as described herein. As will be recognized by those having ordinary skill in the art, not all events in the encoding process are illustrated in FIG. 12. Rather, for clarity, some nonessential matter (such as content well-known in the art or not directly related to embodiments presented, e.g.) has been omitted.

At starting loop block 1214, each picture in a series (a data stream, e.g.) is processed in turn.

At execution block 1216, transform-block-processing routine 1200 extracts the content of a header (a picture header, e.g.) such as a Boolean "deblock_enabled_pic" flag value and a Boolean "deblock_enabled_luma_only_pic" flag value, the effects of which are described below.

At decision block 1222, if the "deblock_enabled_pic" flag is set, then picture-processing routine 1200 calls DBF-blocksize-determination sub-routine 1300 (described below in reference to FIG. 13), which returns a corresponding deblocking filter blocksize. Then picture-processing routine 1200 proceeds to decision block 1224.

At decision block 1224, if the "deblock_enabled_luma_only_pic" flag is set, then picture-processing routine 1200 calls luma-only-DBF-application sub-routine 1400 (described below in reference to FIG. 14), which applies a deblocking filter to the luma component along one or two edges of each suitable block in the image. In a context in which region 600 is part of a luma component of the current picture, for example, this may trigger a blurring operation that affects pixels 641-643 so that the transition across boundary 602 is less pronounced.

However if the "deblock_enabled_luma_only_pic" flag is not set at decision block 1224, then picture-processing routine 1200 calls DBF-application sub-routine 1500 (described below in reference to FIG. 15), which applies a deblocking filter to the luma and chroma components along one or two edges of each suitable block in the image. In a context in which region 700 is part of the current picture, for example, this may trigger a blurring operation that affects luma and chroma components of pixels 771-775 so that the transition across boundary 701 is less pronounced. Alternatively or additionally, the blurring operation may soften the luma and chroma transitions across boundary 701 in some instances as described below.

At ending loop block 1234, picture-processing routine 1200 iterates back to starting loop block 1214 to process the next picture (if any) in the sequence and otherwise stops at termination block 1299.

DBF-Blocksize-Determination Sub-Routine

Figure 13:
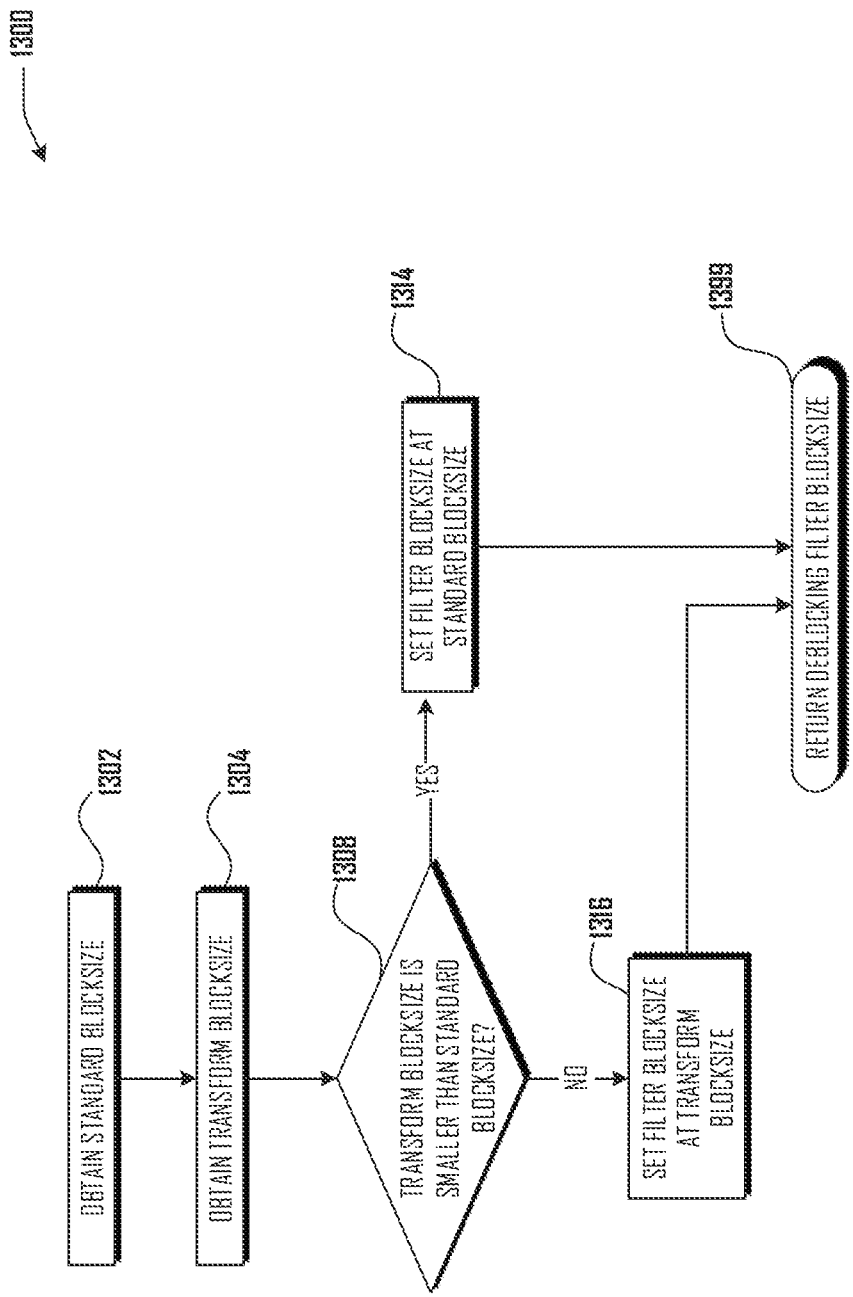
FIG. 13 illustrates a deblocking-filtering-blocksize-determination sub-routine in accordance with at least one embodiment.

FIG. 13 illustrates a DBF-blocksize-determination sub-routine 1300 suitable for use with at least one embodiment, such as when invoked by picture-processing routine 1200 or otherwise in an instance of an encoder 400 or decoder 500 as described herein.

At execution blocks 1302 and 1304, DBF-blocksize-determination sub-routine 1300 obtains a "standard" blocksize (of 8×8 or 16×16, e.g.) and a transform blocksize.

At decision block 1308, if the transform blocksize is smaller than the "standard" blocksize, then DBF-blocksize-determination sub-routine 1300 sets the deblocking filter blocksize to match the "standard" blocksize at execution block 1314 (setting the filter block size to 8×8 if the "standard" blocksize is 8×8 and the transform blocksize is 4×4, e.g.). Otherwise DBF-blocksize-determination sub-routine 1300 sets the deblocking filter blocksize to match the transform blocksize at execution block 1316 (setting the filter block size to 16×16 if that is the transform blocksize and if the "standard" blocksize is 16×16 or smaller, e.g.). In either case, DBF-blocksize-determination sub-routine 1300 then returns the DBF filter blocksize at return block 1399. This can occur, for example, in a marginally workable implementation context (a DBF implemented in software executed by a general-purpose processor, e.g.) in which an unacceptable processing load (resulting in the too-small transform blocksize being used for deblocking, e.g.) would otherwise result (eventually providing a modestly and unnecessarily better picture, e.g.). Such deblocking filtering may be called "layered" insofar that the level of deblocking filtering is deeper—more thorough—when circumstances permit.

In some variants, the deblocking filtering process is only applied to the top and left boundaries of one filter block.

Luma-Only-DBF-Application Sub-Routine

Figure 14:
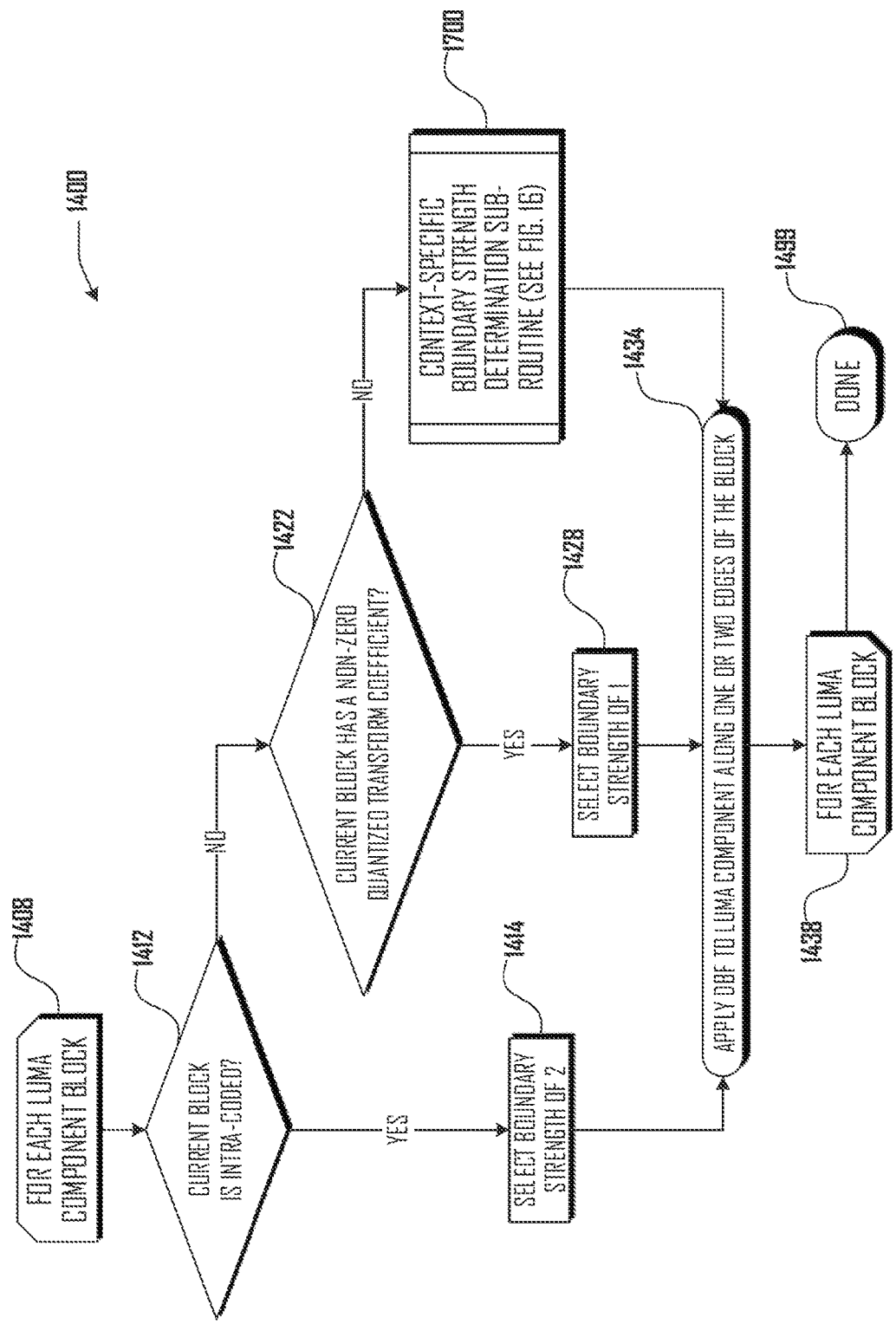
FIG. 14 illustrates a luma-only-DBF-application sub-routine in accordance with at least one embodiment.

FIG. 14 illustrates a luma-only-DBF-application sub-routine 1400 suitable for use with at least one embodiment, such as an instance of encoder 400 or decoder 500 as described herein.

At starting loop block 1408, either the luma component of each block in an image or each block of a monochrome image is processed in turn.

At decision block 1412, if the current block (e.g. an instance of one or more blocks 640, 770, 822 described above) is intra-coded then luma-only-DBF-application sub-routine 1400 indicates a stronger-than-nominal boundary (by selecting a boundary strength of 2, e.g.) at execution block 1414. Otherwise luma-only-DBF-application sub-routine 1400 proceeds to decision block 1422.

At decision block 1422, if the current block has a non-zero quantized transform coefficient then luma-only-DBF-application sub-routine 1400 indicates a nominal-strength boundary (by selecting a boundary strength of 1 or some other intermediate value, e.g.) at execution block 1428. Otherwise luma-only-DBF-application sub-routine 1400 calls a context-specific boundary-strength-determination sub-routine 1600 (described below in reference to FIG. 16), which indicates a nominal or weaker boundary strength.

In whichever case, luma-only-DBF-application sub-routine 1400 then uses the determined boundary strength in applying deblocking filtering at execution block 1434.

At ending loop block 1438, luma-only-DBF-application sub-routine 1400 iterates back to starting loop block 1408 to process the next block in the current picture if any and otherwise stops at termination block 1499.

DBF-Application Sub-Routine

Figure 15:
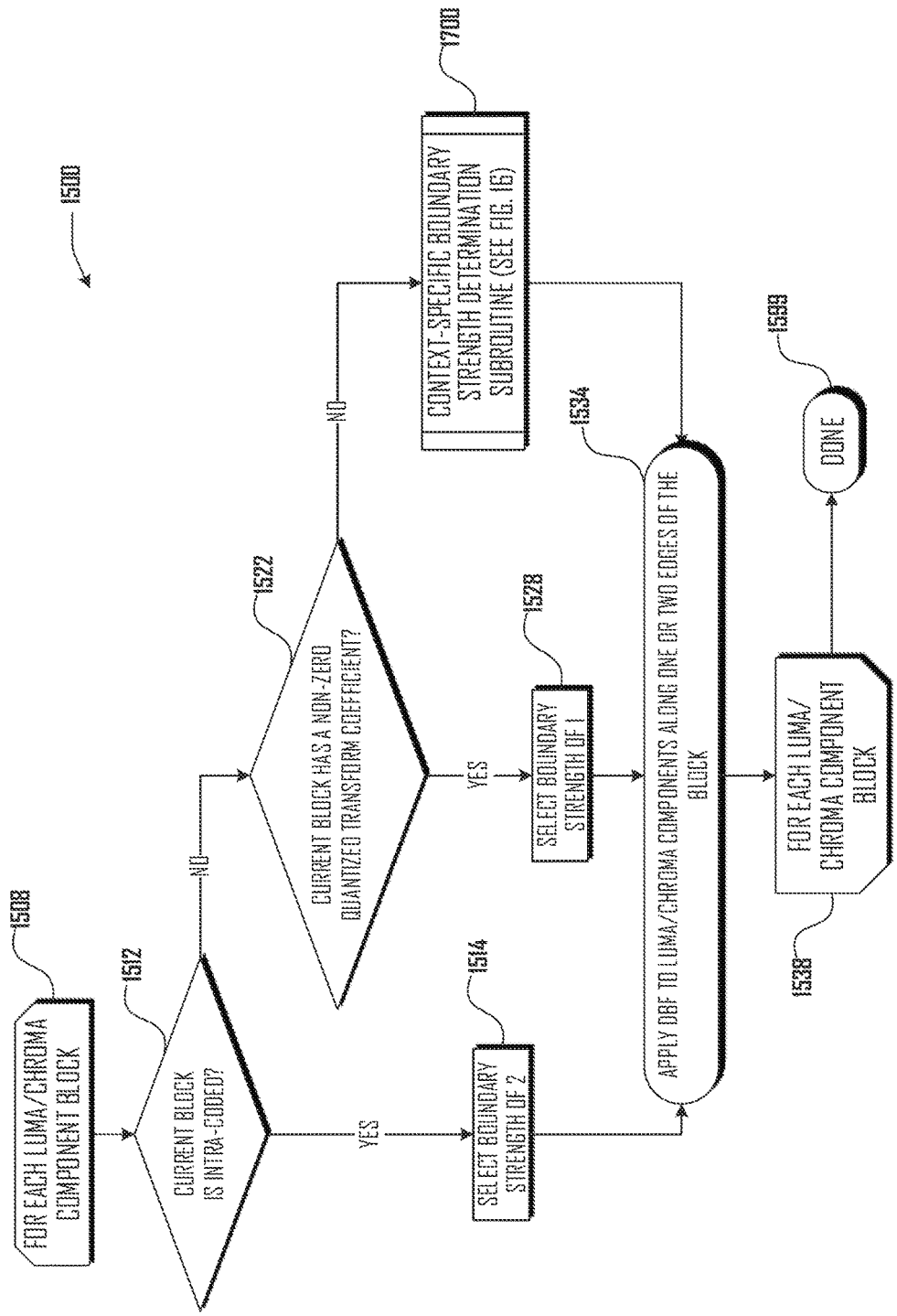
FIG. 15 illustrates a DBF-application sub-routine in accordance with at least one embodiment.

FIG. 15 illustrates a DBF-application sub-routine 1500 suitable for use with at least one embodiment, such as an instance of encoder 400 or decoder 500 as described herein.

At starting loop block 1508, each block in an image is processed in turn.

At decision block 1512, if the current block (e.g. an instance of one or more blocks 640, 822 described above) is intra-coded then DBF-application sub-routine 1500 indicates a stronger-than-nominal boundary (by selecting a boundary strength of 2, e.g.) at execution block 1514. Otherwise DBF-application sub-routine 1500 proceeds to decision block 1522.

At decision block 1522, if the current block has a non-zero quantized transform coefficient then DBF-application sub-routine 1500 indicates a nominal-strength boundary (by selecting a boundary strength of 1, e.g.) at execution block 1528. Otherwise DBF-application sub-routine 1500 calls a context-specific boundary-strength-determination sub-routine 1600 (described below in reference to FIG. 16), which indicates a nominal or weaker boundary strength.

In whichever case, DBF-application sub-routine 1500 then uses the determined boundary strength in applying deblocking filtering at execution block 1534.

At ending loop block 1538, DBF-application sub-routine 1500 iterates back to starting loop block 1508 to process the next block in the current picture if any and otherwise stops at termination block 1599.

Boundary-Strength-Determination Sub-Routine

Figure 16:
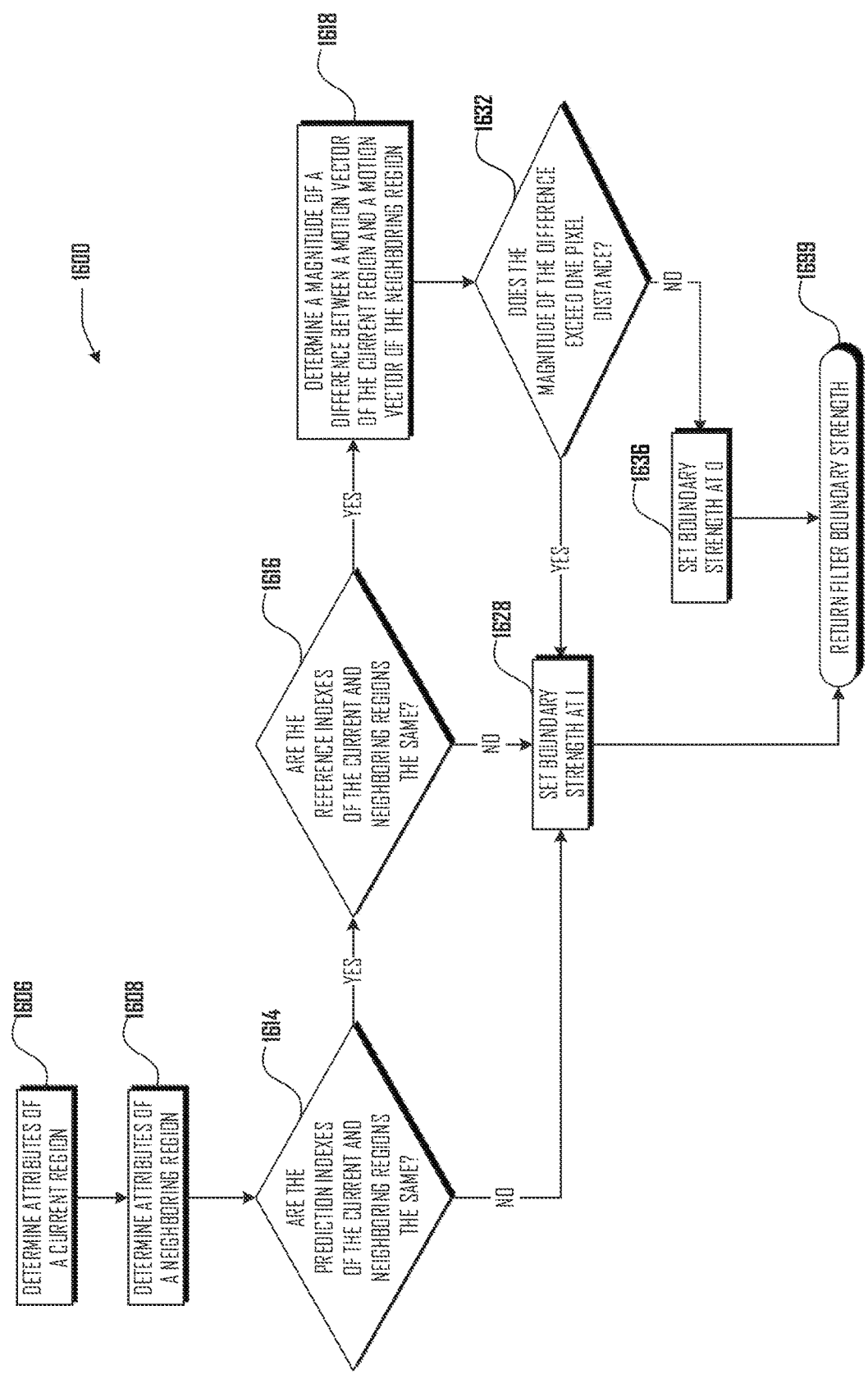
FIG. 16 illustrates a boundary-strength-determination sub-routine in accordance with at least one embodiment.

FIG. 16 illustrates a boundary-strength-determination sub-routine 1600 suitable for use with at least one embodiment, such as an instance of encoder 400 or decoder 500 as described herein.

At execution block 1606, boundary-strength-determination sub-routine 1600 determines one or more attributes of a current region (e.g. one or more of a prediction index, a reference index, or a motion vector of an instance of one or more subblocks/blocks 640, 770, 822 described above).

At execution block 1608, boundary-strength-determination sub-routine 1600 determines the same attribute(s) of a neighboring region (e.g. from an instance of one or more neighboring subblocks/blocks 630, 760, 812, 821 described above).

At decision block 1614, boundary-strength-determination sub-routine 1600 determines whether prediction indexes (PI's) of the current and neighboring regions are the same (such as by determining that a PI that signifies "forward prediction" applies to both the current and neighboring blocks or that respective PI's that signal "backward prediction" and "bidirectional prediction" are not the same, e.g.). If the PI's of the two regions (blocks, e.g.) are not the same, boundary-strength-determination sub-routine 1600 selects a nominal or intermediate boundary strength (having an integer value of 1, e.g.) at execution block 1628.

Otherwise boundary-strength-determination sub-routine 1600 proceeds to decision block 1616, at which the reference indexes (RI's) of the current and neighboring regions are the compared. If the RI of the current region is "LIST0" and the RI of the neighboring region is "LIST1" (signifying references to different pictures, e.g.), for example, boundary-strength-determination sub-routine 1600 selects a nominal boundary strength at execution block 1628.

Otherwise boundary-strength-determination sub-routine 1600 proceeds to execution block 1618, at which a magnitude of a difference between motion vectors (e.g. of neighboring and current blocks 760, 770) is computed. Such difference may be computed as a Euclidean distance or a Manhattan distance, for example. Boundary-strength-determination sub-routine 1600 compares the magnitude of this difference with a threshold (a one pixel distance, e.g.) at execution block 1632. If the magnitude exceeds the threshold, boundary-strength-determination sub-routine 1600 selects a nominal boundary strength at execution block 1628. Otherwise boundary-strength-determination sub-routine 1600 selects a lower boundary strength (zero, e.g.) at execution block 1636. In whichever case, boundary-strength-determination sub-routine 1600 returns the selected boundary strength at return block 1699.

Figure 17:
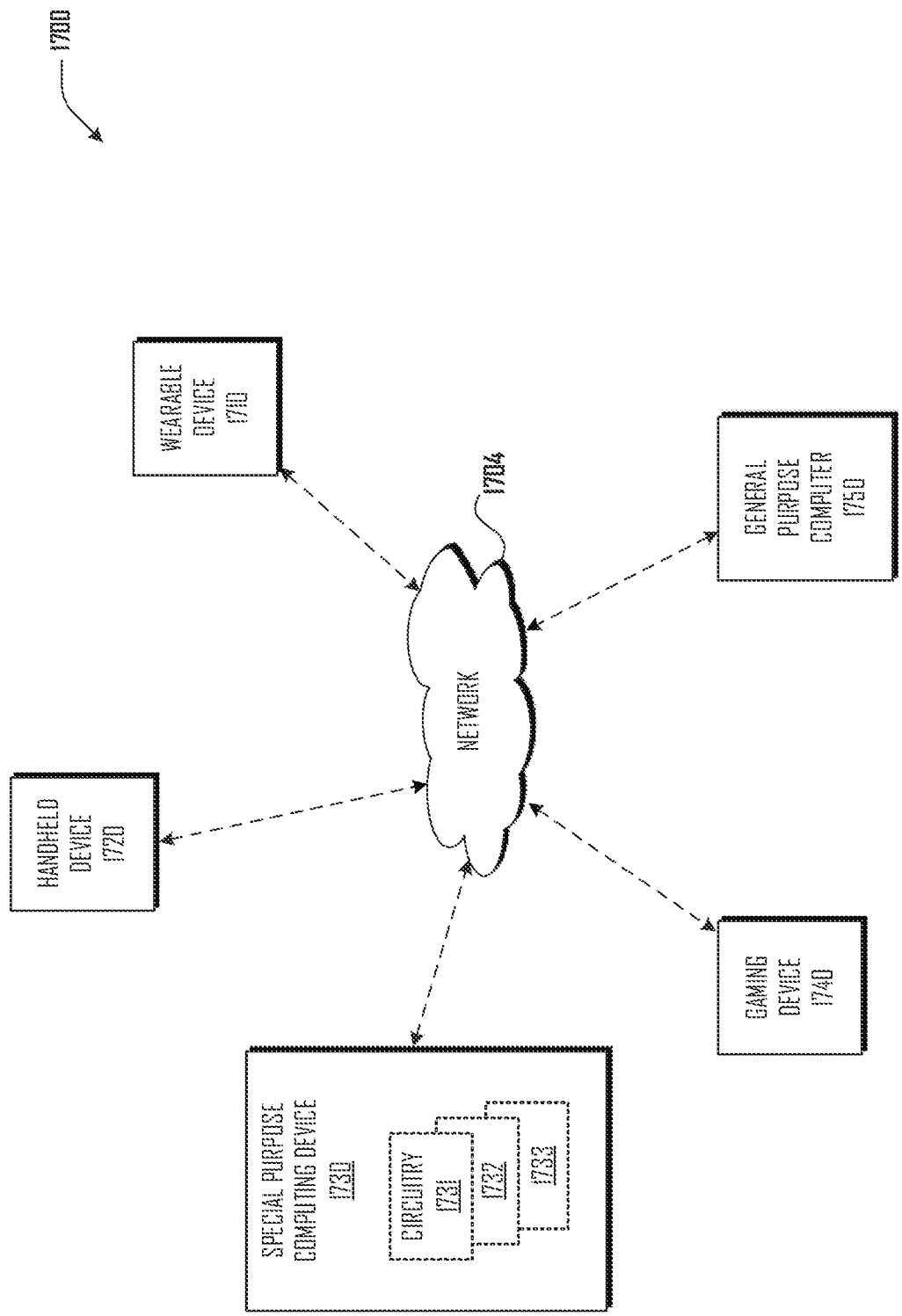
FIG. 17 illustrates an exemplary networked video implementation according to at least one embodiment.

FIG. 17 illustrates an exemplary networked video implementation 1700 in accordance with at least one embodiment. Network 1704 may be in data communication with one or more instances of video-enabled wearable devices 1710, handheld devices 1720, special-purpose computing devices 1730 (having one or more instances of application-specific integrated circuitry 1731, 1732, 1733 in some variants, e.g.), gaming devices 1740, or general-purpose computers 1750 (implementing one or more encoding devices 200 or decoding devices 300 as described above, e.g.).

Video compression guru Peter Symes describes video optimization technology as "a black art involving models of the human psychovisual system that are closely guarded commercial secrets." Absent effective patent law, few market participants would remain viable in this field. Absent robust disclosure and a level playing field, future advances would become less necessary. In fact the secret protocols and structures disclosed herein are more than a mere expression of the state of the art of current codec design. The particular combinations expressed below matter far more than mere occurrences of design choice haphazardly assembled by an engineer of ordinary skill. Rather, they are actually a unique breakthrough that the inventors hereof are disclosing to the public in exchange for a limited period of rightfully exclusive use thereof, as provided by applicable law.

With respect to the numbered clauses and claims expressed below, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Clauses

Clause 1. A computer-implemented method for processing digital video data comprising:
identifying a current block (e.g. one or more of items 640, 770, 822) and a neighboring block (e.g. one or more of items 630, 650, 760, 811, 812, 821), the current and neighboring blocks having a shared size and a linear boundary (e.g. one or more of items 601, 602, 701, 702, 801, 802) therebetween, the current and neighboring blocks both being adjacent the linear boundary;
determining that the shared size of the current and neighboring blocks is smaller than a standard blocksize (e.g. a nominally square size like 8 pixels by 8 pixels); and
applying at least to the current block a deblocking filter with a filtering block size set to the standard blocksize (see FIG. 12 or 13, e.g.).

Clause 2. The computer-implemented method for processing digital video data of Clause 1 further comprising:
configuring a video decoder (see FIG. 5, e.g.) of a device that does not have a video encoder (e.g. one or more of items 300, 1710, 1720, 1730, 1740 configured without a video encoder, e.g.) to perform the identifying and the determining and the applying.

Clause 3. The computer-implemented method for processing digital video data of Clause 1 further comprising:
configuring a decoder loop (by including an instance of DBF processor 488 in local decoder loop 430, e.g.) of a video encoder (e.g. an instance of encoding device 200 in general purpose computer 1750) to perform the identifying and the determining and the applying.

Clause 4. The computer-implemented method for processing digital video data of ANY of the above Clauses wherein the applying to the current block the deblocking filter with the filtering block size set to the standard blocksize comprises:
invoking circuitry (e.g. an instance of special-purpose circuitry 1731) configured to apply to the current block the deblocking filter with the filtering block size set to the standard blocksize as an automatic and conditional response to a determination that the shared size of the current and neighboring blocks is smaller than a standard blocksize and also configured to apply to the current block a deblocking filter with a filtering block size set to the shared size of the current and neighboring blocks as an automatic and conditional response to a determination that the shared size of the current and neighboring blocks is at least equal to a standard blocksize.

Clause 5. The computer-implemented method for processing digital video data of ANY of the above Clauses further comprising:
invoking circuitry (e.g. an instance of special-purpose circuitry 1732) configured to apply to the current block a deblocking filter with a filtering block size set to the shared size of the current and neighboring blocks as an automatic and conditional response to a determination that the shared size of the current and neighboring blocks is at least equal to a standard blocksize.

Clause 6. The computer-implemented method for processing digital video data of ANY of the above Clauses wherein the identifying the current block and the neighboring block further comprises:
selecting a first block and a second block separated by a horizontal boundary respectively as the neighboring block (e.g. one or more of items 650, 760, 812) and the current block (e.g. one or more of items 640, 770, 822), the horizontal boundary being the linear boundary (e.g. one or more of items 601, 701, 802).

Clause 7. The computer-implemented method for processing digital video data of ANY of the above Clauses wherein the identifying the current block and the neighboring block further comprises:
selecting a square blocksize as the standard blocksize.

Clause 8. The computer-implemented method for processing digital video data of ANY of the above Clauses wherein the identifying the current block and the neighboring block further comprises:
selecting a blocksize of at least 8 pixels by 8 pixels as the standard blocksize.

Clause 9. The computer-implemented method for processing digital video data of ANY of the above Clauses wherein the identifying the current block and the neighboring block further comprises:
selecting a blocksize of at most 8 pixels by 8 pixels as the standard blocksize.

Clause 10. The computer-implemented method for processing digital video data of ANY of the above Clauses wherein the identifying the current block and the neighboring block further comprises:
identifying as the shared size a blocksize selected from the group consisting of 4 pixels by 4 pixels, 8 pixels by 8 pixels, and 16 pixels by 16 pixels (see FIG. 11, e.g.).

Clause 11. The computer-implemented method for processing digital video data of ANY of the above Clauses further comprising:
configuring a gaming device (e.g. an instance of item 1740) to perform the identifying and the determining and the applying.

Clause 12. The computer-implemented method for processing digital video data of ANY of the above Clauses further comprising:
configuring a handheld networked computing device (e.g. one or more of items 1720, 1730) to perform the identifying and the determining and the applying.

Clause 13. The computer-implemented method for processing digital video data of ANY of the above Clauses further comprising:
configuring a wearable networked computing device (e.g. one or more of items 1710, 1730) to perform the identifying and the determining and the applying.

Clause 14. The computer-implemented method for processing digital video data of ANY of the above Clauses further comprising:
configuring a general purpose processor (in general purpose computer 1750 that executes a software implementation of the method) to perform the identifying and the determining and the applying.

Clause 15. The computer-implemented method for processing digital video data of ANY of the above Clauses wherein the current and neighboring blocks are consecutive transform blocks.

Clause 16. The computer-implemented method for processing digital video data of ANY of the above Clauses further comprising:
configuring the deblocking filter with a first boundary strength if an image block that includes the current and neighboring blocks is intra-coded and configuring the deblocking filter with a second boundary strength lower than the first boundary strength if the image block is not intra-coded (see FIG. 14 or 15, e.g.).

Clause 17. The computer-implemented method for processing digital video data of ANY of the above Clauses further comprising:
configuring the deblocking filter with a first boundary strength if an image block that includes the current and neighboring blocks is intra-coded and configuring the deblocking filter with a second boundary strength lower than the first boundary strength if the image block is not intra-coded, the second boundary strength having a lower strength value if a quantized transform coefficient associated with the filtering block size is zero and the second boundary strength having a higher strength value if the quantized transform coefficient associated with the filtering block size is not zero (see FIG. 14 or 15, e.g.).

With respect to the appended claims below, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to,"

"related to," or other past-tense adjectives are generally not intended to exclude such variants, unless context dictates otherwise.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A computer-implemented method for processing digital video data comprising:
    identifying a current block and a neighboring block, the current block and the neighboring block having (a) same, particular size and (b) a linear boundary therebetween, the current block and neighboring block both being adjacent the linear boundary;
    determining that the particular size is smaller than a standard block size; and
    applying at least to the current block a deblocking filter with a filtering block size set to the standard block size.

2. The computer-implemented method for processing digital video data of claim 1 further comprising:
    configuring a video decoder of a device that does not have a video encoder to perform the identifying and the determining and the applying.

3. The computer-implemented method for processing digital video data of claim 1 further comprising:
    configuring a decoder loop of a video encoder to perform the identifying and the determining and the applying.

4. The computer-implemented method for processing digital video data of claim 3 wherein the applying to the current block the deblocking filter with the filtering block size set to the standard block size comprises:
    applying to the current block the deblocking filter with the filtering block size set to the standard block size as an automatic and conditional response to a determination that the particular size is smaller than a standard block size.

5. The computer-implemented method for processing digital video data of claim 1 further comprising:
    applying to the current block a deblocking filter with a filtering block size set to the particular size as an automatic and conditional response to a determination that the particular size is at least equal to the standard block size.

6. The computer-implemented method for processing digital video data of claim 5 wherein the identifying the current block and the neighboring block further comprises:
    selecting a first block and a second block separated by a horizontal boundary respectively as the neighboring block and the current block, the horizontal boundary being the linear boundary.

7. The computer-implemented method for processing digital video data of claim 6 wherein the identifying the current block and the neighboring block further comprises:
    selecting a square block size as the standard block size.

8. The computer-implemented method for processing digital video data of claim 1 wherein the identifying the current block and the neighboring block further comprises: selecting a block size of at least 8 pixels by 8 pixels as the standard block size.

9. The computer-implemented method for processing digital video data of claim 1 further comprising:
    configuring a gaming device to perform at least one of the identifying, the determining, or the applying.

10. The computer-implemented method for processing digital video data of claim 1 further comprising:
    configuring a handheld networked computing device to perform at least one of the identifying, the determining, or the applying.

11. The computer-implemented method for processing digital video data of claim 1 further comprising:
    configuring a wearable networked computing device to perform at least one of the identifying, the determining, or the applying.

12. The computer-implemented method for processing digital video data of claim 1 wherein the identifying the current block and the neighboring block further comprises:
    identifying, as the same, particular size of the current block and the neighboring block, a block size selected from the group consisting of 4 pixels by 4 pixels, 8 pixels by 8 pixels, and 16 pixels by 16 pixels.

13. The computer-implemented method for processing digital video data of claim 1 further comprising:
    configuring a general purpose processor to perform at least one of the identifying, the determining, or the applying.

14. The computer-implemented method for processing digital video data of claim 1 wherein the current block and the neighboring block are consecutive transform blocks.

15. The computer-implemented method for processing digital video data of claim 1 further comprising:
    configuring the deblocking filter with a first boundary strength if an image block that includes the current block and the neighboring block is intra-coded and configuring the deblocking filter with a second boundary strength lower than the first boundary strength if the image block is not intra-coded.

16. The computer-implemented method for processing digital video data of claim 1 further comprising:
    configuring the deblocking filter with a first boundary strength if an image block that includes the current block and the neighboring block is intra-coded and configuring the deblocking filter with a second boundary strength lower than the first boundary strength if the image block is not intra-coded, the second boundary strength having a lower strength value if a quantized transform coefficient associated with the filtering block size is zero and the second boundary strength having a higher strength value if the quantized transform coefficient associated with the filtering block size is not zero.

17. The computer-implemented method for processing digital video data of claim 1 wherein a general-purpose processor performs the identifying and the determining and the applying with the deblocking filter implemented only in software.

* * * * *